United States Patent
Goldfein et al.

(10) Patent No.: US 12,436,777 B2
(45) Date of Patent: Oct. 7, 2025

(54) GRAPHICAL USER INTERFACE FOR FUNGIBLE CONFIGURABLE ATTRIBUTES FOR A COMPUTE INSTANCE

(71) Applicant: Oracle International Corporation, Redwood Shores, CA (US)

(72) Inventors: Daniel S. Goldfein, Seattle, WA (US); Sanjay Pillai, Seattle, WA (US); Max Yekaterynenko, Leander, TX (US); Shihao Sun, Kirkland, WA (US); Ali R. Sahibzada, Woodinville, WA (US)

(73) Assignee: Oracle International Corporation, Redwood Shores, CA (US)

( * ) Notice: Subject to any disclaimer, the term of this patent is extended or adjusted under 35 U.S.C. 154(b) by 160 days.

(21) Appl. No.: 18/479,697

(22) Filed: Oct. 2, 2023

(65) Prior Publication Data

US 2024/0303101 A1    Sep. 12, 2024

Related U.S. Application Data

(60) Provisional application No. 63/450,571, filed on Mar. 7, 2023.

(51) Int. Cl.
*G06F 9/44* (2018.01)
*G06F 3/0482* (2013.01)
*G06F 9/445* (2018.01)
*G06F 9/455* (2018.01)

(52) U.S. Cl.
CPC ........ *G06F 9/44505* (2013.01); *G06F 3/0482* (2013.01); *G06F 9/45508* (2013.01)

(58) Field of Classification Search
CPC ....................................................... G06F 9/44
See application file for complete search history.

(56) References Cited

U.S. PATENT DOCUMENTS

| | | | |
|---|---|---|---|
| 7,322,010 B1* | 1/2008 | Mikula | G06F 11/1469 715/734 |
| 10,979,534 B1 | 4/2021 | Parulkar et al. | |
| 2003/0163798 A1* | 8/2003 | Hwang | G06F 30/30 716/102 |
| 2006/0190486 A1* | 8/2006 | Zhou | G06Q 10/06 |
| 2014/0365626 A1 | 12/2014 | Radhakrishnan et al. | |
| 2016/0171530 A1* | 6/2016 | Sa | G06Q 30/0251 705/14.49 |

* cited by examiner

*Primary Examiner* — Jae U Jeon
(74) *Attorney, Agent, or Firm* — Invoke

(57) ABSTRACT

Techniques for configuring and creating a compute instance are disclosed. A system displays, within a Graphical User Interface (GUI), first and second interface elements representing first and second configurable attributes of a compute instance. Each interface element comprises a first selectable component and a second selectable component. The system receives a first user input selecting the first selectable component corresponding to a system-selected configuration for the first configurable attribute and selects a value for the first configurable attribute. The system receives a second user input selecting the second selectable component corresponding to a user-selected configuration for the second configurable attribute and displays a third interface element configured to receive user input specifying a value for the second configurable attribute. The system receives user input specifying the second value for the second configurable attribute and launches the compute instance.

20 Claims, 13 Drawing Sheets

GRAPHICAL USER INTERFACE FOR FUNGIBLE CONFIGURABLE ATTRIBUTES FOR A COMPUTE INSTANCE

TECHNICAL FIELD

The present disclosure relates to configuring compute instances in a cloud computing system. In particular, the present disclosure relates to configuring compute instances when the requesting user specifies criteria for constraining compute instance attribute value(s) but does not specify the actual value(s) for the compute instance attribute.

BACKGROUND

A user requesting the creation of a compute instance with a cloud computing provider may specify values for a set of attributes that the user wishes the compute instance to have. For example, the user may specify a processor type, a region to host the compute instance, and an amount of memory that the compute instance should have available. If the cloud computing provider is unable to meet one or more of the user's requirements, the cloud computing service may not be able to launch the requested compute instance, even if functional equivalents are available. For example, the requested processor type might be available in a different region, or an equivalent processor architecture from a vendor other than the one requested may be available in the requested region.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

Figure 1:
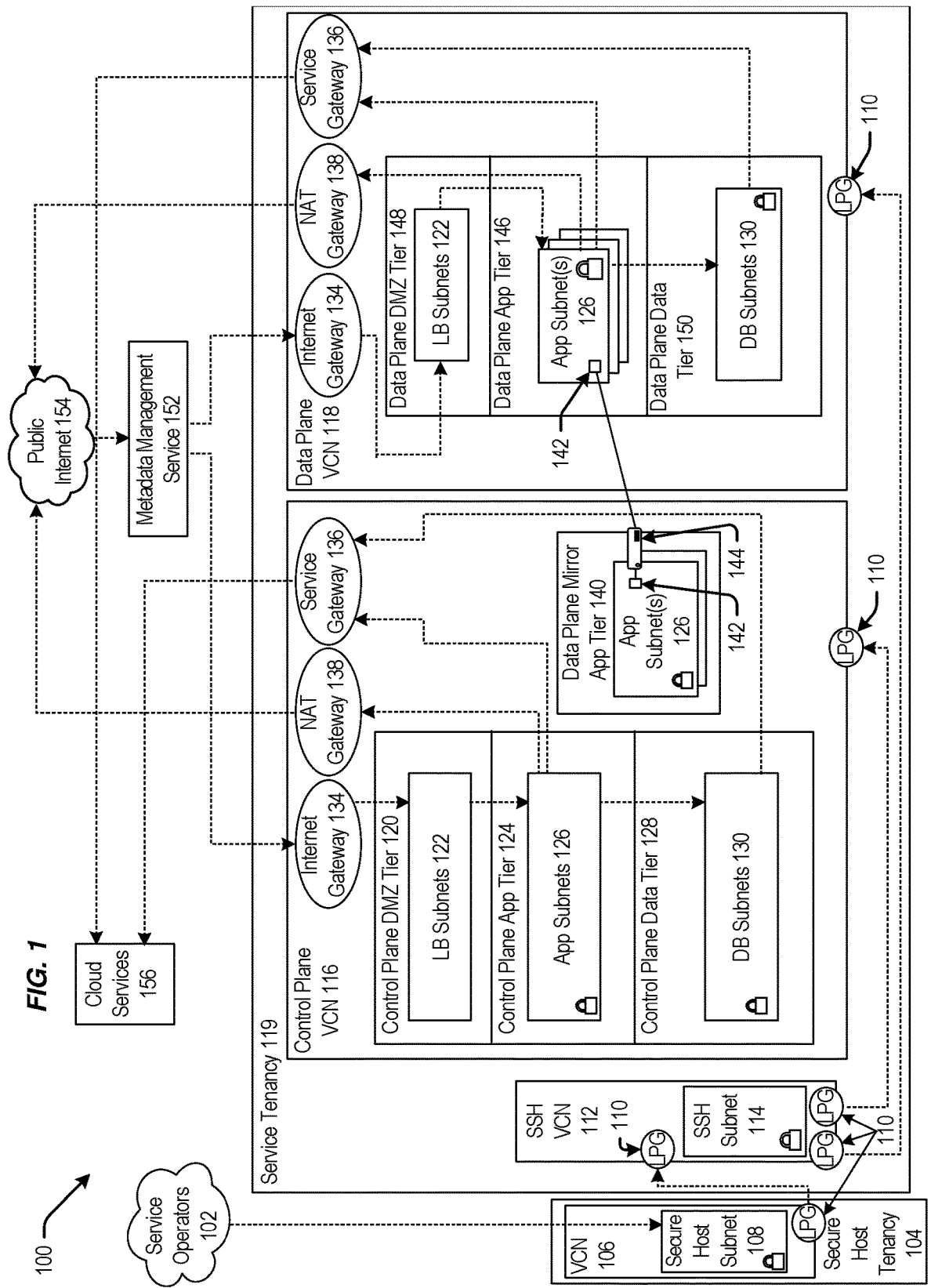
FIG. 1 is a block diagram illustrating one pattern for implementing a cloud infrastructure as a service system, according to at least one embodiment.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. INFRASTRUCTURE AS A SERVICE
3. COMPUTE INSTANCE CONFIGURATION SYSTEM ARCHITECTURE
4. GRAPHICAL USER INTERFACE
5. CONFIGURING A COMPUTE INSTANCE
6. EXAMPLE EMBODIMENT
7. PRACTICAL APPLICATIONS, ADVANTAGES, AND IMPROVEMENTS
8. COMPUTER NETWORKS AND CLOUD NETWORKS
9. MISCELLANEOUS; EXTENSIONS

A compute shape refers to a set of processing resources that can be allocated to a user as a compute instance within a cloud service provider's environment for performing some function or set of functions. A compute instance is a specific compute shape defined by a processing unit of a particular processor type, a number of cores for the processing unit, and an amount of memory available for use by the processing unit. A processor type may be defined by a processor architecture, e.g., x86 or ARM; a processor vendor, e.g., INTEL, AMD, or ARM; and a generation.

A compute instance may be further defined by additional configurable attributes, such as a fault domain, an availability domain, a region, and a launch time. A fault domain refers to a set of hardware components (e.g., computers and switches) that share a single point of failure. An availability domain refers to a data center that is both physically isolated from other data centers and does not share resources, such as power and cooling resources, with other data centers. A region is a geographical grouping of multiple availability domains (ADs). The ADs within a region may be interconnected with a low latency, high bandwidth network.

1. GENERAL OVERVIEW

One or more embodiments generate a display a configuration interface for configuring attributes of a compute instance. The system displays, within the configuration interface, multiple interface elements that allow for specifying a user-selected configuration for a configurable attribute of a compute instance or a system-selected configuration for the configurable attribute of the compute instance. If the system receives initial user input selecting a user-selected configuration for the configurable attribute of the compute instance, the system displays an additional interface element that is configured to receive a user-selected value for configuring the configurable attribute. If the system receives initial user input selecting a system-selected configuration for the configurable attribute of the compute instance, the system selects the value ("system-selected value") for configuring the configurable attribute. The system then launches the compute instance with the selected value for the configurable attribute of the compute instance, the selected value being one of the user-selected value or the system-selected value.

One or more embodiments described in this Specification and/or recited in the claims may not be included in this General Overview section.

2. INFRASTRUCTURE AS A SERVICE

Infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (example services include billing software, monitoring software, logging software, load balancing software, clustering software, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

FIG. 1 is a block diagram 100 illustrating an example pattern of an IaaS architecture, according to at least one embodiment. Service operators 102 can be communicatively coupled to a secure host tenancy 104 that can include a virtual cloud network (VCN) 106 and a secure host subnet 108. In some examples, the service operators 102 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 106 and/or the Internet.

The VCN 106 can include a local peering gateway (LPG) 110 that can be communicatively coupled to a secure shell (SSH) VCN 112 via an LPG 110 contained in the SSH VCN 112. The SSH VCN 112 can include an SSH subnet 114, and the SSH VCN 112 can be communicatively coupled to a control plane VCN 116 via the LPG 110 contained in the control plane VCN 116. Also, the SSH VCN 112 can be communicatively coupled to a data plane VCN 118 via an LPG 110. The control plane VCN 116 and the data plane VCN 118 can be contained in a service tenancy 119 that can be owned and/or operated by the IaaS provider.

The control plane VCN 116 can include a control plane demilitarized zone (DMZ) tier 120 that acts as a perimeter network (e.g., portions of a corporate network between the corporate intranet and external networks). The DMZ-based servers may have restricted responsibilities and help keep breaches contained. Additionally, the DMZ tier 120 can include one or more load balancer (LB) subnet(s) 122, a control plane app tier 124 that can include app subnet(s) 126, a control plane data tier 128 that can include database (DB) subnet(s) 130 (e.g., frontend DB subnet(s) and/or backend DB subnet(s)). The LB subnet(s) 122 contained in the control plane DMZ tier 120 can be communicatively coupled to the app subnet(s) 126 contained in the control plane app tier 124 and an Internet gateway 134 that can be contained in the control plane VCN 116, and the app subnet(s) 126 can be communicatively coupled to the DB subnet(s) 130 contained in the control plane data tier 128 and a service gateway 136 and a network address translation (NAT) gateway 138. The control plane VCN 116 can include the service gateway 136 and the NAT gateway 138.

The control plane VCN 116 can include a data plane mirror app tier 140 that can include app subnet(s) 126. The app subnet(s) 126 contained in the data plane mirror app tier 140 can include a virtual network interface controller (VNIC) 142 that can execute a compute instance 144. The compute instance 144 can communicatively couple the app subnet(s) 126 of the data plane mirror app tier 140 to app subnet(s) 126 that can be contained in a data plane app tier 146.

The data plane VCN 118 can include the data plane app tier 146, a data plane DMZ tier 148, and a data plane data tier 150. The data plane DMZ tier 148 can include LB subnet(s) 122 that can be communicatively coupled to the app subnet(s) 126 of the data plane app tier 146 and the Internet gateway 134 of the data plane VCN 118. The app subnet(s) 126 can be communicatively coupled to the service gateway 136 of the data plane VCN 118 and the NAT gateway 138 of the data plane VCN 118. The data plane data tier 150 can also include the DB subnet(s) 130 that can be communicatively coupled to the app subnet(s) 126 of the data plane app tier 146.

The Internet gateway 134 of the control plane VCN 116 and of the data plane VCN 118 can be communicatively coupled to a metadata management service 152 that can be communicatively coupled to public Internet 154. Public Internet 154 can be communicatively coupled to the NAT gateway 138 of the control plane VCN 116 and of the data plane VCN 118. The service gateway 136 of the control plane VCN 116 and of the data plane VCN 118 can be communicatively couple to cloud services 156.

In some examples, the service gateway 136 of the control plane VCN 116 or of the data plane VCN 118 can make application programming interface (API) calls to cloud services 156 without going through public Internet 154. The API calls to cloud services 156 from the service gateway 136 can be one-way: the service gateway 136 can make API calls to cloud services 156, and cloud services 156 can send requested data to the service gateway 136. But, cloud services 156 may not initiate API calls to the service gateway 136.

In some examples, the secure host tenancy 104 can be directly connected to the service tenancy 119, which may be otherwise isolated. The secure host subnet 108 can communicate with the SSH subnet 114 through an LPG 110 that may enable two-way communication over an otherwise isolated system. Connecting the secure host subnet 108 to the SSH subnet 114 may give the secure host subnet 108 access to other entities within the service tenancy 119.

The control plane VCN 116 may allow users of the service tenancy 119 to set up or otherwise provision desired resources. Desired resources provisioned in the control plane VCN 116 may be deployed or otherwise used in the data plane VCN 118. In some examples, the control plane VCN 116 can be isolated from the data plane VCN 118, and the data plane mirror app tier 140 of the control plane VCN 116 can communicate with the data plane app tier 146 of the data plane VCN 118 via VNICs 142 that can be contained in the data plane mirror app tier 140 and the data plane app tier 146.

In some examples, users of the system, or customers, can make requests, for example create, read, update, or delete (CRUD) operations, through public Internet 154 that can communicate the requests to the metadata management service 152. The metadata management service 152 can communicate the request to the control plane VCN 116 through the Internet gateway 134. The request can be received by the LB subnet(s) 122 contained in the control plane DMZ tier 120. The LB subnet(s) 122 may determine that the request is valid, and in response to this determination, the LB subnet(s) 122 can transmit the request to app subnet(s) 126 contained in the control plane app tier 124. If the request is validated and requires a call to public Internet 154, the call to public Internet 154 may be transmitted to the NAT gateway 138 that can make the call to public Internet 154. Metadata that may be desired to be stored by the request can be stored in the DB subnet(s) 130.

In some examples, the data plane mirror app tier 140 can facilitate direct communication between the control plane VCN 116 and the data plane VCN 118. For example, changes, updates, or other suitable modifications to configuration may be desired to be applied to the resources contained in the data plane VCN 118. Via a VNIC 142, the control plane VCN 116 can directly communicate with, and can thereby execute the changes, updates, or other suitable modifications to configuration to, resources contained in the data plane VCN 118.

In some embodiments, the control plane VCN 116 and the data plane VCN 118 can be contained in the service tenancy 119. In this case, the user, or the customer, of the system may not own or operate either the control plane VCN 116 or the data plane VCN 118. Instead, the IaaS provider may own or operate the control plane VCN 116 and the data plane VCN 118, both of which may be contained in the service tenancy 119. This embodiment can enable isolation of networks that may prevent users or customers from interacting with other users', or other customers', resources. Also, this embodiment may allow users or customers of the system to store databases privately without needing to rely on public Internet 154, which may not have a desired level of threat prevention, for storage.

In other embodiments, the LB subnet(s) 122 contained in the control plane VCN 116 can be configured to receive a signal from the service gateway 136. In this embodiment, the control plane VCN 116 and the data plane VCN 118 may be configured to be called by a customer of the IaaS provider without calling public Internet 154. Customers of the IaaS provider may desire this embodiment since database(s) that the customers use may be controlled by the IaaS provider and may be stored on the service tenancy 119, which may be isolated from public Internet 154.

Figure 2:
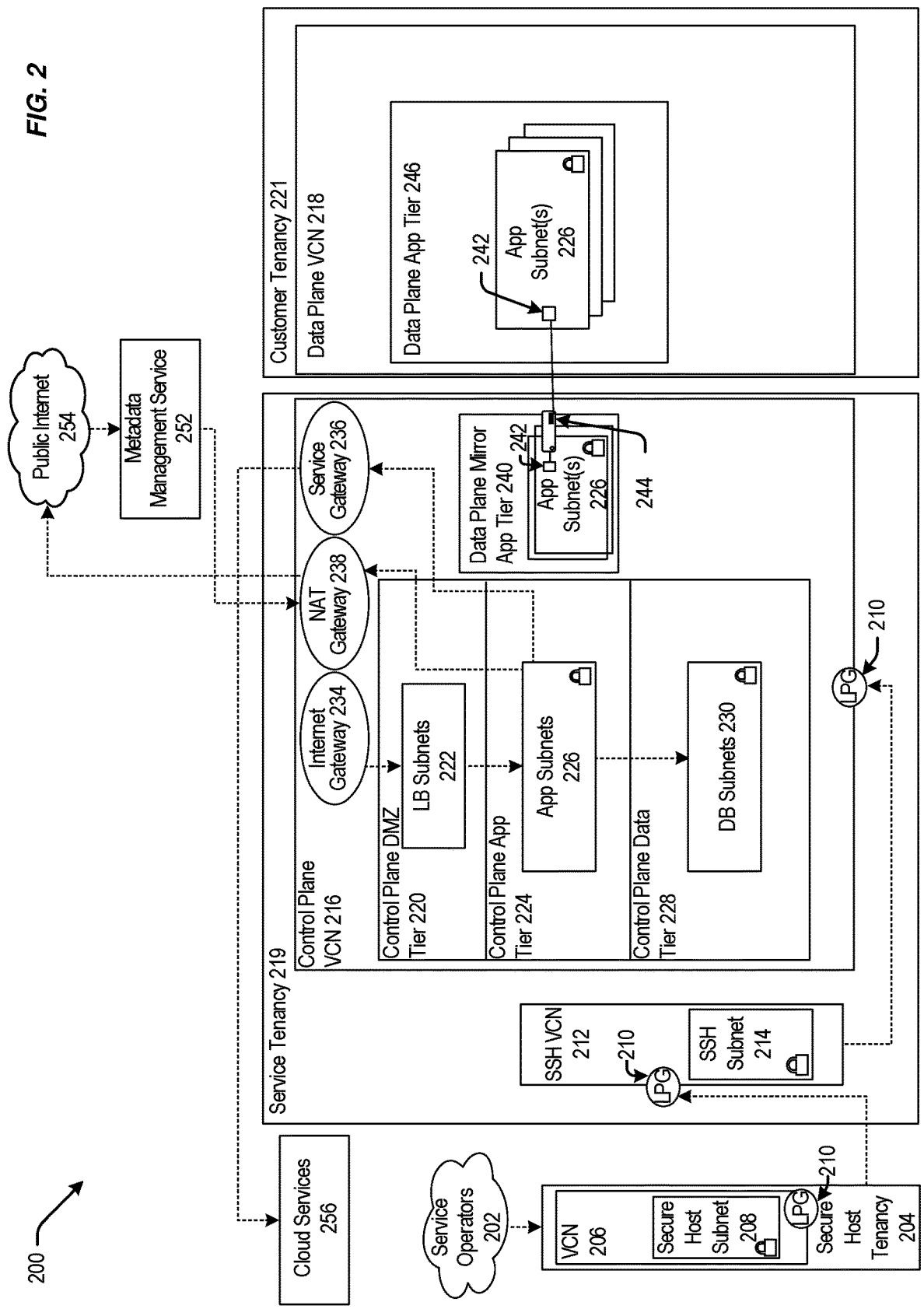
FIG. 2 is a block diagram illustrating another pattern for implementing a cloud infrastructure as a service system, according to at least one embodiment.

FIG. 2 is a block diagram 200 illustrating another example pattern of an IaaS architecture, according to at least one embodiment. Service operators 202 (e.g., service operators 102 of FIG. 1) can be communicatively coupled to a secure host tenancy 204 (e.g., the secure host tenancy 104 of FIG. 1) that can include a virtual cloud network (VCN) 206 (e.g., the VCN 106 of FIG. 1) and a secure host subnet 208 (e.g., the secure host subnet 108 of FIG. 1). The VCN 206 can include a local peering gateway (LPG) 210 (e.g., the LPG 110 of FIG. 1) that can be communicatively coupled to a secure shell (SSH) VCN 212 (e.g., the SSH VCN 112 of FIG. 1) via an LPG 110 contained in the SSH VCN 212. The SSH VCN 212 can include an SSH subnet 214 (e.g., the SSH subnet 114 of FIG. 1), and the SSH VCN 212 can be communicatively coupled to a control plane VCN 216 (e.g., the control plane VCN 116 of FIG. 1) via an LPG 210 contained in the control plane VCN 216. The control plane VCN 216 can be contained in a service tenancy 219 (e.g., the service tenancy 119 of FIG. 1), and the data plane VCN 218 (e.g., the data plane VCN 118 of FIG. 1) can be contained in a customer tenancy 221 that may be owned or operated by users, or customers, of the system.

The control plane VCN 216 can include a control plane DMZ tier 220 (e.g., the control plane DMZ tier 120 of FIG. 1) that can include LB subnet(s) 222 (e.g., LB subnet(s) 122 of FIG. 1), a control plane app tier 224 (e.g., the control plane app tier 124 of FIG. 1) that can include app subnet(s) 226 (e.g., app subnet(s) 126 of FIG. 1), a control plane data tier 228 (e.g., the control plane data tier 128 of FIG. 1) that can include database (DB) subnet(s) 230 (e.g., similar to DB subnet(s) 130 of FIG. 1). The LB subnet(s) 222 contained in the control plane DMZ tier 220 can be communicatively coupled to the app subnet(s) 226 contained in the control plane app tier 224 and an Internet gateway 234 (e.g., the Internet gateway 134 of FIG. 1) that can be contained in the control plane VCN 216, and the app subnet(s) 226 can be communicatively coupled to the DB subnet(s) 230 contained in the control plane data tier 228 and a service gateway 236 (e.g., the service gateway 136 of FIG. 1) and a network address translation (NAT) gateway 238 (e.g., the NAT gateway 138 of FIG. 1). The control plane VCN 216 can include the service gateway 236 and the NAT gateway 238.

The control plane VCN 216 can include a data plane mirror app tier 240 (e.g., the data plane mirror app tier 140 of FIG. 1) that can include app subnet(s) 226. The app subnet(s) 226 contained in the data plane mirror app tier 240 can include a virtual network interface controller (VNIC) 242 (e.g., the VNIC of 142) that can execute a compute instance 244 (e.g., similar to the compute instance 144 of FIG. 1). The compute instance 244 can facilitate communication between the app subnet(s) 226 of the data plane mirror app tier 240 and the app subnet(s) 226 that can be contained in a data plane app tier 246 (e.g., the data plane app tier 146 of FIG. 1) via the VNIC 242 contained in the data plane mirror app tier 240 and the VNIC 242 contained in the data plane app tier 246.

The Internet gateway 234 contained in the control plane VCN 216 can be communicatively coupled to a metadata management service 252 (e.g., the metadata management service 152 of FIG. 1) that can be communicatively coupled to public Internet 254 (e.g., public Internet 154 of FIG. 1). Public Internet 254 can be communicatively coupled to the NAT gateway 238 contained in the control plane VCN 216. The service gateway 236 contained in the control plane VCN 216 can be communicatively couple to cloud services 256 (e.g., cloud services 156 of FIG. 1).

In some examples, the data plane VCN 218 can be contained in the customer tenancy 221. In this case, the IaaS provider may provide the control plane VCN 216 for each customer, and the IaaS provider may, for each customer, set up a unique compute instance 244 that is contained in the service tenancy 219. Each compute instance 244 may allow communication between the control plane VCN 216, contained in the service tenancy 219, and the data plane VCN 218 that is contained in the customer tenancy 221. The compute instance 244 may allow resources, that are provisioned in the control plane VCN 216 that is contained in the service tenancy 219, to be deployed or otherwise used in the data plane VCN 218 that is contained in the customer tenancy 221.

In other examples, the customer of the IaaS provider may have databases that live in the customer tenancy 221. In this example, the control plane VCN 216 can include the data plane mirror app tier 240 that can include app subnet(s) 226. The data plane mirror app tier 240 can reside in the data plane VCN 218, but the data plane mirror app tier 240 may not live in the data plane VCN 218. That is, the data plane mirror app tier 240 may have access to the customer tenancy 221, but the data plane mirror app tier 240 may not exist in the data plane VCN 218 or be owned or operated by the customer of the IaaS provider. The data plane mirror app tier 240 may be configured to make calls to the data plane VCN 218 but may not be configured to make calls to any entity contained in the control plane VCN 216. The customer may desire to deploy or otherwise use resources in the data plane VCN 218 that are provisioned in the control plane VCN 216, and the data plane mirror app tier 240 can facilitate the desired deployment, or other usage of resources, of the customer.

In some embodiments, the customer of the IaaS provider can apply filters to the data plane VCN 218. In this embodiment, the customer can determine what the data plane VCN 218 can access, and the customer may restrict access to public Internet 254 from the data plane VCN 218. The IaaS provider may not be able to apply filters or otherwise control access of the data plane VCN 218 to any outside networks or databases. Applying filters and controls by the customer onto the data plane VCN 218, contained in the customer tenancy 221, can help isolate the data plane VCN 218 from other customers and from public Internet 254.

In some embodiments, cloud services 256 can be called by the service gateway 236 to access services that may not exist on public Internet 254, on the control plane VCN 216, or on the data plane VCN 218. The connection between cloud services 256 and the control plane VCN 216 or the data plane VCN 218 may not be live or continuous. Cloud services 256 may exist on a different network owned or operated by the IaaS provider. Cloud services 256 may be configured to receive calls from the service gateway 236 and may be configured to not receive calls from public Internet 254. Some cloud services 256 may be isolated from other cloud services 256, and the control plane VCN 216 may be isolated from cloud services 256 that may not be in the same region as the control plane VCN 216. For example, the control plane VCN 216 may be located in "Region 1," and cloud service "Deployment 1," may be located in Region 1 and in "Region 2." If a call to Deployment 1 is made by the service gateway 236 contained in the control plane VCN 216 located in Region 1, the call may be transmitted to Deployment 1 in Region 1. In this example, the control plane VCN 216, or Deployment 1 in Region 1, may not be communicatively coupled to, or otherwise in communication with, Deployment 1 in Region 2.

Figure 3:
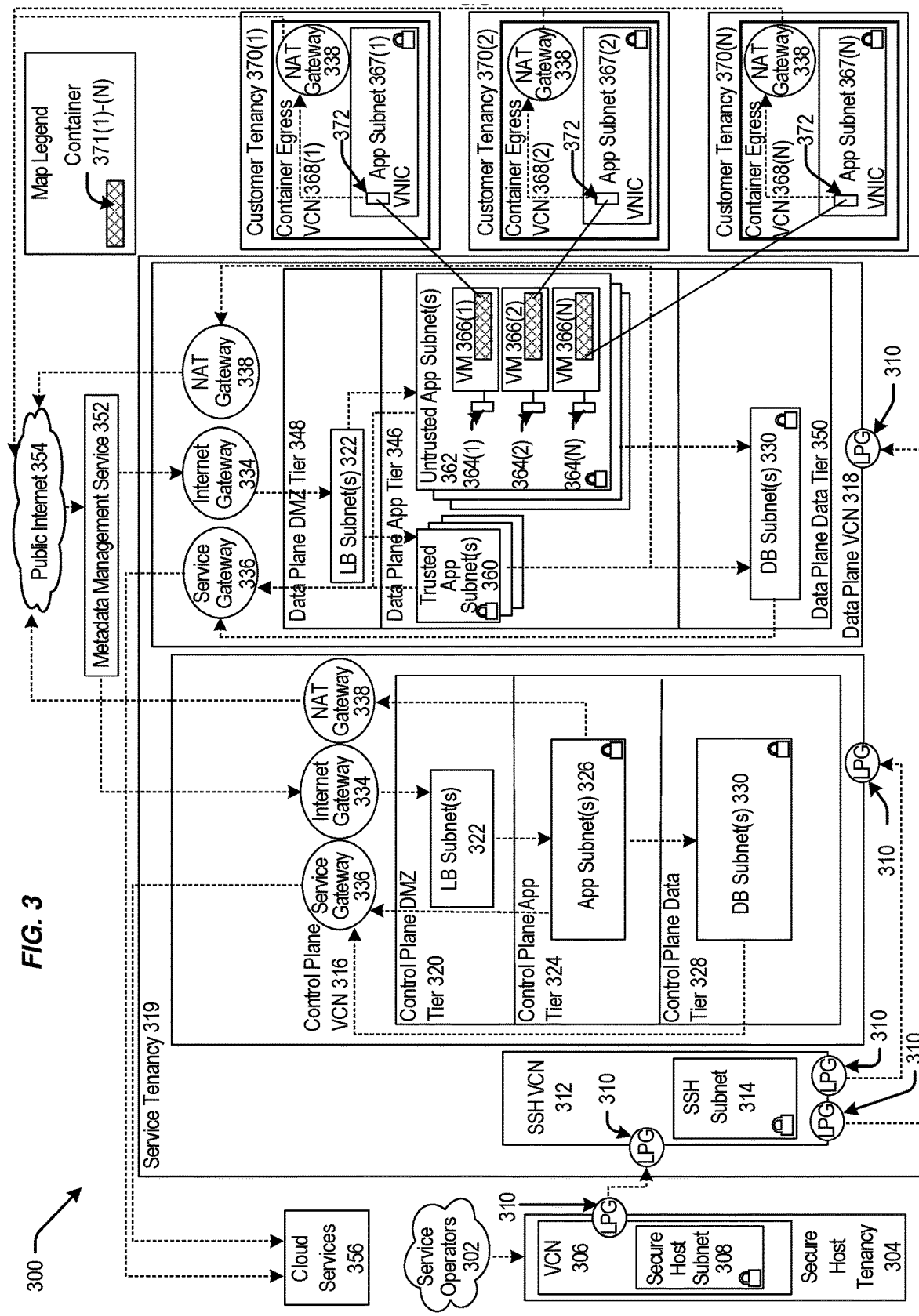
FIG. 3 is a block diagram illustrating another pattern for implementing a cloud infrastructure as a service system, according to at least one embodiment.

FIG. 3 is a block diagram 300 illustrating another example pattern of an IaaS architecture, according to at least one embodiment. Service operators 302 (e.g., service operators 102 of FIG. 1) can be communicatively coupled to a secure host tenancy 304 (e.g., the secure host tenancy 104 of FIG. 1) that can include a virtual cloud network (VCN) 306 (e.g., the VCN 106 of FIG. 1) and a secure host subnet 308 (e.g., the secure host subnet 108 of FIG. 1). The VCN 306 can include an LPG 310 (e.g., the LPG 110 of FIG. 1) that can be communicatively coupled to an SSH VCN 312 (e.g., the SSH VCN 112 of FIG. 1) via an LPG 310 contained in the SSH VCN 312. The SSH VCN 312 can include an SSH subnet 314 (e.g., the SSH subnet 114 of FIG. 1), and the SSH VCN 312 can be communicatively coupled to a control plane VCN 316 (e.g., the control plane VCN 116 of FIG. 1) via an LPG 310 contained in the control plane VCN 316 and to a data plane VCN 318 (e.g., the data plane 118 of FIG. 1) via an LPG 310 contained in the data plane VCN 318. The control plane VCN 316 and the data plane VCN 318 can be contained in a service tenancy 319 (e.g., the service tenancy 119 of FIG. 1).

The control plane VCN 316 can include a control plane DMZ tier 320 (e.g., the control plane DMZ tier 120 of FIG. 1) that can include load balancer (LB) subnet(s) 322 (e.g., LB subnet(s) 122 of FIG. 1), a control plane app tier 324 (e.g., the control plane app tier 124 of FIG. 1) that can include app subnet(s) 326 (e.g., similar to app subnet(s) 126 of FIG. 1), a control plane data tier 328 (e.g., the control plane data tier 128 of FIG. 1) that can include DB subnet(s) 330. The LB subnet(s) 322 contained in the control plane DMZ tier 320 can be communicatively coupled to the app subnet(s) 326 contained in the control plane app tier 324 and to an Internet gateway 334 (e.g., the Internet gateway 134 of FIG. 1) that can be contained in the control plane VCN 316, and the app subnet(s) 326 can be communicatively coupled to the DB subnet(s) 330 contained in the control plane data tier 328 and to a service gateway 336 (e.g., the service gateway of FIG. 1) and a network address translation (NAT) gateway 338 (e.g., the NAT gateway 138 of FIG. 1). The control plane VCN 316 can include the service gateway 336 and the NAT gateway 338.

The data plane VCN 318 can include a data plane app tier 346 (e.g., the data plane app tier 146 of FIG. 1), a data plane DMZ tier 348 (e.g., the data plane DMZ tier 148 of FIG. 1), and a data plane data tier 350 (e.g., the data plane data tier 150 of FIG. 1). The data plane DMZ tier 348 can include LB subnet(s) 322 that can be communicatively coupled to trusted app subnet(s) 360 and untrusted app subnet(s) 362 of the data plane app tier 346 and the Internet gateway 334 contained in the data plane VCN 318. The trusted app subnet(s) 360 can be communicatively coupled to the service gateway 336 contained in the data plane VCN 318, the NAT gateway 338 contained in the data plane VCN 318, and DB subnet(s) 330 contained in the data plane data tier 350. The untrusted app subnet(s) 362 can be communicatively coupled to the service gateway 336 contained in the data plane VCN 318 and DB subnet(s) 330 contained in the data plane data tier 350. The data plane data tier 350 can include DB subnet(s) 330 that can be communicatively coupled to the service gateway 336 contained in the data plane VCN 318.

The untrusted app subnet(s) 362 can include one or more primary VNICs 364(1)-(N) that can be communicatively coupled to tenant virtual machines (VMs) 366(1)-(N). Each tenant VM 366(1)-(N) can be communicatively coupled to a respective app subnet 367(1)-(N) that can be contained in respective container egress VCNs 368(1)-(N) that can be contained in respective customer tenancies 370(1)-(N). Respective secondary VNICs 372(1)-(N) can facilitate communication between the untrusted app subnet(s) 362 contained in the data plane VCN 318 and the app subnet contained in the container egress VCNs 368(1)-(N). Each container egress VCNs 368(1)-(N) can include a NAT gateway 338 that can be communicatively coupled to public Internet 354 (e.g., public Internet 154 of FIG. 1).

The Internet gateway 334 contained in the control plane VCN 316 and contained in the data plane VCN 318 can be communicatively coupled to a metadata management service 352 (e.g., the metadata management system 152 of FIG. 1) that can be communicatively coupled to public Internet 354. Public Internet 354 can be communicatively coupled to the NAT gateway 338 contained in the control plane VCN 316 and contained in the data plane VCN 318. The service gateway 336 contained in the control plane VCN 316 and contained in the data plane VCN 318 can be communicatively couple to cloud services 356.

In some embodiments, the data plane VCN 318 can be integrated with customer tenancies 370. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane app tier 346. Code to run the function may be executed in the VMs 366(1)-(N), and the code may not be configured to run anywhere else on the data plane VCN 318. Each VM 366(1)-(N) may be connected to one customer tenancy 370. Respective containers 371(1)-(N) contained in the VMs 366(1)-(N) may be configured to run the code. In this case, there can be a dual isolation (e.g., the containers 371(1)-(N) running code, where the containers 371(1)-(N) may be contained in at least the VM 366(1)-(N) that are contained in the untrusted app subnet(s) 362), which may help prevent incorrect or otherwise undesirable code from damaging the network of the IaaS provider or from damaging a network of a different customer. The containers 371(1)-(N) may be communicatively coupled to the customer tenancy 370 and may be configured to transmit or receive data from the customer tenancy 370. The containers 371(1)-(N) may not be configured to transmit or receive data from any other entity in the data plane VCN 318. Upon completion of running the code, the IaaS provider may kill or otherwise dispose of the containers 371(1)-(N).

In some embodiments, the trusted app subnet(s) 360 may run code that may be owned or operated by the IaaS provider. In this embodiment, the trusted app subnet(s) 360 may be communicatively coupled to the DB subnet(s) 330 and be configured to execute CRUD operations in the DB subnet(s) 330. The untrusted app subnet(s) 362 may be communicatively coupled to the DB subnet(s) 330, but in this embodiment, the untrusted app subnet(s) may be configured to execute read operations in the DB subnet(s) 330. The containers 371(1)-(N) that can be contained in the VM 366(1)-(N) of each customer and that may run code from the customer may not be communicatively coupled with the DB subnet(s) 330.

In other embodiments, the control plane VCN 316 and the data plane VCN 318 may not be directly communicatively coupled. In this embodiment, there may be no direct communication between the control plane VCN 316 and the data plane VCN 318. However, communication can occur indirectly through at least one method. An LPG 310 may be established by the IaaS provider that can facilitate communication between the control plane VCN 316 and the data plane VCN 318. In another example, the control plane VCN 316 or the data plane VCN 318 can make a call to cloud services 356 via the service gateway 336. For example, a call to cloud services 356 from the control plane VCN 316 can include a request for a service that can communicate with the data plane VCN 318.

Figure 4:
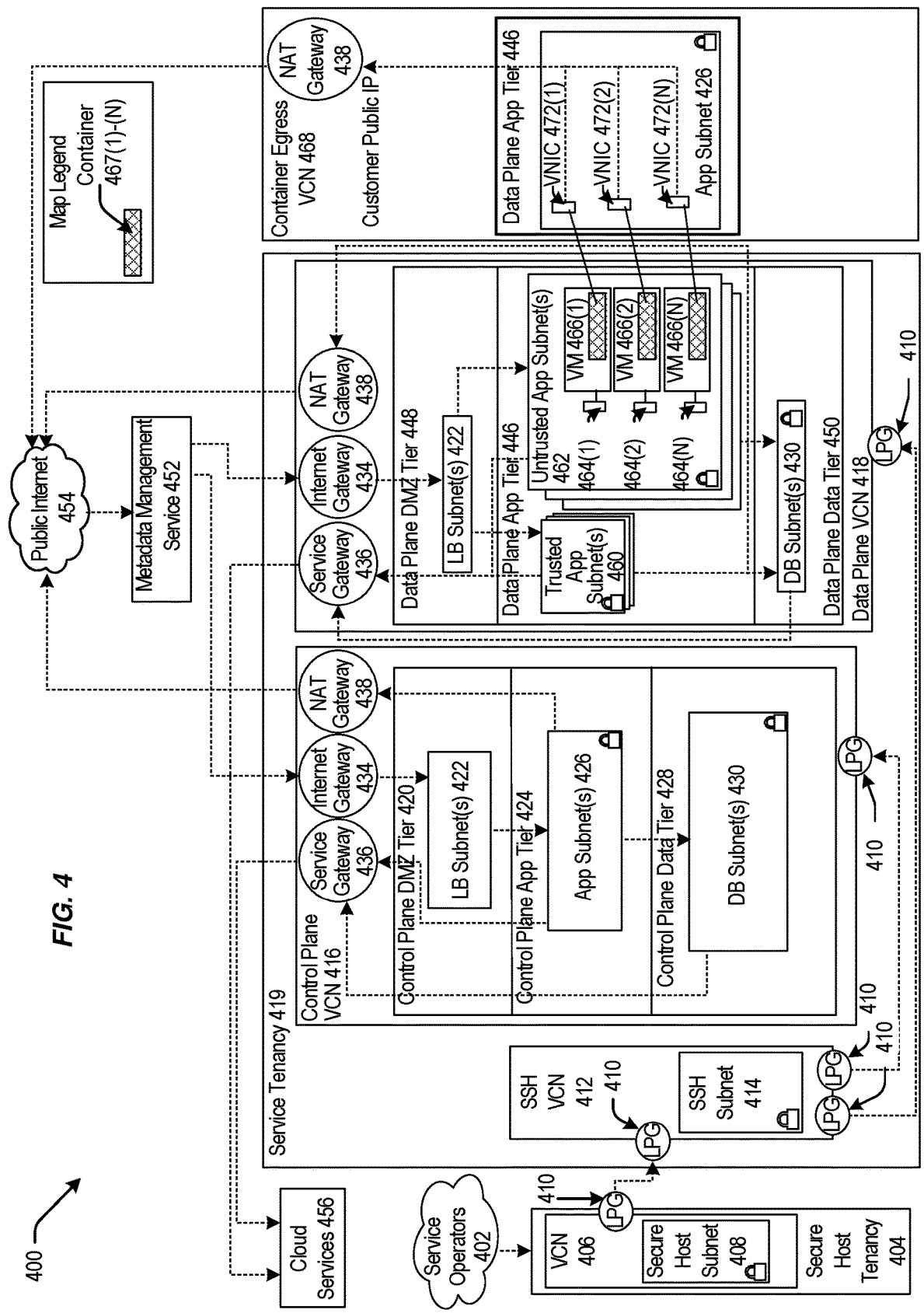
FIG. 4 is a block diagram illustrating another pattern for implementing a cloud infrastructure as a service system, according to at least one embodiment.

FIG. 4 is a block diagram 400 illustrating another example pattern of an IaaS architecture, according to at least one embodiment. Service operators 402 (e.g., service operators 102 of FIG. 1) can be communicatively coupled to a secure host tenancy 404 (e.g., the secure host tenancy 104 of FIG. 1) that can include a virtual cloud network (VCN) 406 (e.g., the VCN 106 of FIG. 1) and a secure host subnet 408 (e.g., the secure host subnet 108 of FIG. 1). The VCN 406 can include an LPG 410 (e.g., the LPG 110 of FIG. 1) that can be communicatively coupled to an SSH VCN 412 (e.g., the SSH VCN 112 of FIG. 1) via an LPG 410 contained in the SSH VCN 412. The SSH VCN 412 can include an SSH subnet 414 (e.g., the SSH subnet 114 of FIG. 1), and the SSH VCN 412 can be communicatively coupled to a control plane VCN 416 (e.g., the control plane VCN 116 of FIG. 1) via an LPG 410 contained in the control plane VCN 416 and to a data plane VCN 418 (e.g., the data plane 118 of FIG. 1) via an LPG 410 contained in the data plane VCN 418. The control plane VCN 416 and the data plane VCN 418 can be contained in a service tenancy 419 (e.g., the service tenancy 119 of FIG. 1).

The control plane VCN 416 can include a control plane DMZ tier 420 (e.g., the control plane DMZ tier 120 of FIG. 1) that can include LB subnet(s) 422 (e.g., LB subnet(s) 122 of FIG. 1), a control plane app tier 424 (e.g., the control plane app tier 124 of FIG. 1) that can include app subnet(s) 426 (e.g., app subnet(s) 126 of FIG. 1), a control plane data tier 428 (e.g., the control plane data tier 128 of FIG. 1) that can include DB subnet(s) 430 (e.g., DB subnet(s) 330 of FIG. 3). The LB subnet(s) 422 contained in the control plane DMZ tier 420 can be communicatively coupled to the app subnet(s) 426 contained in the control plane app tier 424 and to an Internet gateway 434 (e.g., the Internet gateway 134 of FIG. 1) that can be contained in the control plane VCN 416, and the app subnet(s) 426 can be communicatively coupled to the DB subnet(s) 430 contained in the control plane data tier 428 and to a service gateway 436 (e.g., the service gateway of FIG. 1) and a network address translation (NAT) gateway 438 (e.g., the NAT gateway 138 of FIG. 1). The control plane VCN 416 can include the service gateway 436 and the NAT gateway 438.

The data plane VCN 418 can include a data plane app tier 446 (e.g., the data plane app tier 146 of FIG. 1), a data plane DMZ tier 448 (e.g., the data plane DMZ tier 148 of FIG. 1), and a data plane data tier 450 (e.g., the data plane data tier 150 of FIG. 1). The data plane DMZ tier 448 can include LB subnet(s) 422 that can be communicatively coupled to trusted app subnet(s) 460 (e.g., trusted app subnet(s) 360 of FIG. 3) and untrusted app subnet(s) 462 (e.g., untrusted app subnet(s) 362 of FIG. 3) of the data plane app tier 446 and the Internet gateway 434 contained in the data plane VCN 418. The trusted app subnet(s) 460 can be communicatively coupled to the service gateway 436 contained in the data plane VCN 418, the NAT gateway 438 contained in the data plane VCN 418, and DB subnet(s) 430 contained in the data plane data tier 450. The untrusted app subnet(s) 462 can be communicatively coupled to the service gateway 436 contained in the data plane VCN 418 and DB subnet(s) 430 contained in the data plane data tier 450. The data plane data tier 450 can include DB subnet(s) 430 that can be communicatively coupled to the service gateway 436 contained in the data plane VCN 418.

The untrusted app subnet(s) 462 can include primary VNICs 464(1)-(N) that can be communicatively coupled to tenant virtual machines (VMs) 466(1)-(N) residing within the untrusted app subnet(s) 462. Each tenant VM 466(1)-(N) can run code in a respective container 467(1)-(N), and be communicatively coupled to an app subnet 426 that can be contained in a data plane app tier 446 that can be contained in a container egress VCN 468. Respective secondary VNICs 472(1)-(N) can facilitate communication between the untrusted app subnet(s) 462 contained in the data plane VCN 418 and the app subnet contained in the container egress VCN 468. The container egress VCN can include a NAT gateway 438 that can be communicatively coupled to public Internet 454 (e.g., public Internet 154 of FIG. 1).

The Internet gateway 434 contained in the control plane VCN 416 and contained in the data plane VCN 418 can be communicatively coupled to a metadata management service 452 (e.g., the metadata management system 152 of FIG. 1) that can be communicatively coupled to public Internet 454. Public Internet 454 can be communicatively coupled to the NAT gateway 438 contained in the control plane VCN 416 and contained in the data plane VCN 418. The service gateway 436 contained in the control plane VCN 416 and contained in the data plane VCN 418 can be communicatively couple to cloud services 456.

In some examples, the pattern illustrated by the architecture of block diagram 400 of FIG. 4 may be considered an exception to the pattern illustrated by the architecture of block diagram 300 of FIG. 3 and may be desirable for a customer of the IaaS provider if the IaaS provider cannot directly communicate with the customer (e.g., a disconnected region). The respective containers 467(1)-(N) that are contained in the VMs 466(1)-(N) for each customer can be accessed in real-time by the customer. The containers 467(1)-(N) may be configured to make calls to respective secondary VNICs 472(1)-(N) contained in app subnet(s) 426 of the data plane app tier 446 that can be contained in the container egress VCN 468. The secondary VNICs 472(1)-(N) can transmit the calls to the NAT gateway 438 that may transmit the calls to public Internet 454. In this example, the containers 467(1)-(N) that can be accessed in real-time by the customer can be isolated from the control plane VCN 416 and can be isolated from other entities contained in the data plane VCN 418. The containers 467(1)-(N) may also be isolated from resources from other customers.

In other examples, the customer can use the containers 467(1)-(N) to call cloud services 456. In this example, the customer may run code in the containers 467(1)-(N) that requests a service from cloud services 456. The containers 467(1)-(N) can transmit this request to the secondary VNICs 472(1)-(N) that can transmit the request to the NAT gateway that can transmit the request to public Internet 454. Public Internet 454 can transmit the request to LB subnet(s) 422 contained in the control plane VCN 416 via the Internet gateway 434. In response to determining the request is valid, the LB subnet(s) can transmit the request to app subnet(s) 426 that can transmit the request to cloud services 456 via the service gateway 436.

It should be appreciated that IaaS architectures 100, 200, 300, 400 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 5:
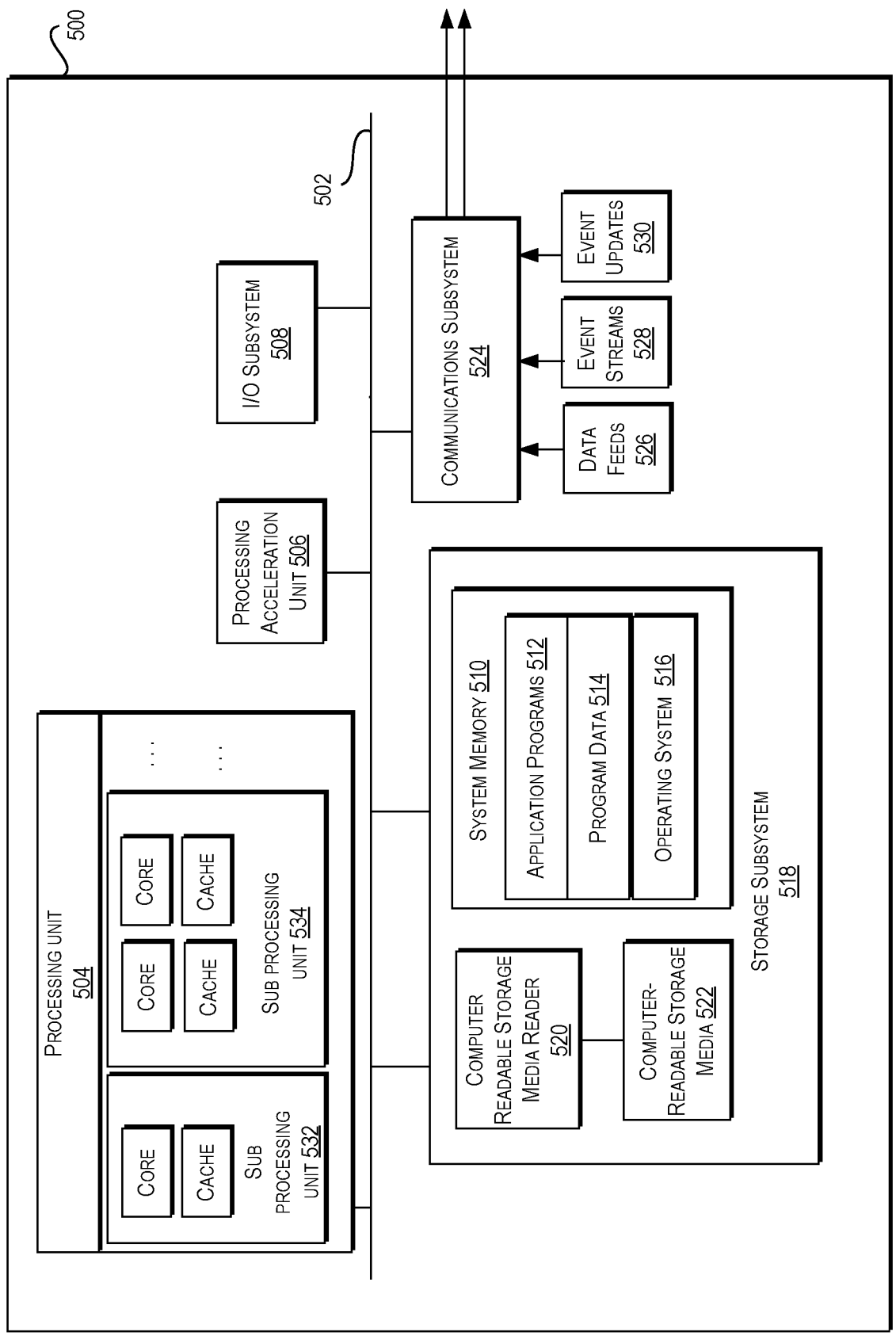
FIG. 5 is a block diagram illustrating an example computer system, according to at least one embodiment.

FIG. 5 illustrates an example computer system 500, in which various embodiments may be implemented. The system 500 may be used to implement any of the computer systems described above. As shown in the figure, computer system 500 includes a processing unit 504 that communicates with a number of peripheral subsystems via a bus subsystem 502. These peripheral subsystems may include a processing acceleration unit 506, an I/O subsystem 508, a storage subsystem 518 and a communications subsystem 524. Storage subsystem 518 includes tangible computer-readable storage media 522 and a system memory 510.

Bus subsystem 502 provides a mechanism for letting the various components and subsystems of computer system 500 communicate with each other as intended. Although bus subsystem 502 is shown schematically as a single bus, alternative embodiments of the bus subsystem may utilize multiple buses. Bus subsystem 502 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 504, which can be implemented as one or more integrated circuits (e.g., a conventional microprocessor or microcontroller), controls the operation of computer system 500. One or more processors may be included in processing unit 504. These processors may include single core or multicore processors. In certain embodiments, processing unit 504 may be implemented as one or more independent processing units 532 and/or 534 with single or multicore processors included in each processing unit. In other embodiments, processing unit 504 may also be implemented as a quad-core processing unit formed by integrating two dual-core processors into a single chip.

In various embodiments, processing unit 504 can execute a variety of programs in response to program code and can maintain multiple concurrently executing programs or processes. At any given time, some or all of the program code to be executed can be resident in processor(s) 504 and/or in storage subsystem 518. Through suitable programming, processor(s) 504 can provide various functionalities described above. Computer system 500 may additionally include a processing acceleration unit 506, which can include a digital signal processor (DSP), a special-purpose processor, and/or the like.

I/O subsystem 508 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 500 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 500 may comprise a storage subsystem 518 that provides a tangible non-transitory computer-readable storage medium for storing software and data constructs that provide the functionality of the embodiments described in this disclosure. The software can include programs, code modules, instructions, scripts, etc., that when executed by one or more cores or processors of processing unit 504 provide the functionality described above. Storage subsystem 518 may also provide a repository for storing data used in accordance with the present disclosure.

As depicted in the example in FIG. 5, storage subsystem 518 can include various components including a system memory 510, computer-readable storage media 522, and a computer readable storage media reader 520. System memory 510 may store program instructions that are loadable and executable by processing unit 504. System memory 510 may also store data that is used during the execution of the instructions and/or data that is generated during the execution of the program instructions. Various different kinds of programs may be loaded into system memory 510 including but not limited to client applications, Web browsers, mid-tier applications, relational database management systems (RDBMS), virtual machines, containers, etc.

System memory 510 may also store an operating system 516. Examples of operating system 516 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, and Palm® OS operating systems. In certain implementations where computer system 500 executes one or more virtual machines, the virtual machines along with their guest operating systems (GOSs) may be loaded into system memory 510 and executed by one or more processors or cores of processing unit 504.

System memory 510 can come in different configurations depending upon the type of computer system 500. For example, system memory 510 may be volatile memory (such as random access memory (RAM)) and/or non-volatile memory (such as read-only memory (ROM), flash memory, etc.) Different types of RAM configurations may be provided including a static random access memory (SRAM), a dynamic random access memory (DRAM), and others. In some implementations, system memory 510 may include a basic input/output system (BIOS) containing basic routines that help to transfer information between elements within computer system 500, such as during start-up.

Computer-readable storage media 522 may represent remote, local, fixed, and/or removable storage devices plus storage media for temporarily and/or more permanently containing, storing, computer-readable information for use by computer system 500 including instructions executable by processing unit 504 of computer system 500.

Computer-readable storage media 522 can include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media.

By way of example, computer-readable storage media 522 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 522 may include, but is not limited to, Zip® drives, flash memory cards, universal serial bus (USB) flash drives, secure digital (SD) cards, DVD disks, digital video tape, and the like. Computer-readable storage media 522 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 500.

Machine-readable instructions executable by one or more processors or cores of processing unit 504 may be stored on a non-transitory computer-readable storage medium. A non-transitory computer-readable storage medium can include physically tangible memory or storage devices that include volatile memory storage devices and/or non-volatile storage devices. Examples of non-transitory computer-readable storage medium include magnetic storage media (e.g., disk or tapes), optical storage media (e.g., DVDs, CDs), various types of RAM, ROM, or flash memory, hard drives, floppy drives, detachable memory drives (e.g., USB drives), or other type of storage device.

Communications subsystem 524 provides an interface to other computer systems and networks. Communications subsystem 524 serves as an interface for receiving data from and transmitting data to other systems from computer system 500. For example, communications subsystem 524 may enable computer system 500 to connect to one or more devices via the Internet. In some embodiments communications subsystem 524 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 524 can provide wired network connectivity (e.g., Ethernet) in addition to or instead of a wireless interface.

In some embodiments, communications subsystem 524 may also receive input communication in the form of structured and/or unstructured data feeds 526, event streams 528, event updates 530, and the like on behalf of one or more users who may use computer system 500.

By way of example, communications subsystem 524 may be configured to receive data feeds 526 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 524 may also be configured to receive data in the form of continuous data streams, which may include event streams 528 of real-time events and/or event updates 530, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 524 may also be configured to output the structured and/or unstructured data feeds 526, event streams 528, event updates 530, and the like to one or more databases that may be in communication with one or more streaming data source computers coupled to computer system 500.

Computer system 500 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 500 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

3. COMPUTE INSTANCE CONFIGURATION SYSTEM ARCHITECTURE

Figure 6:
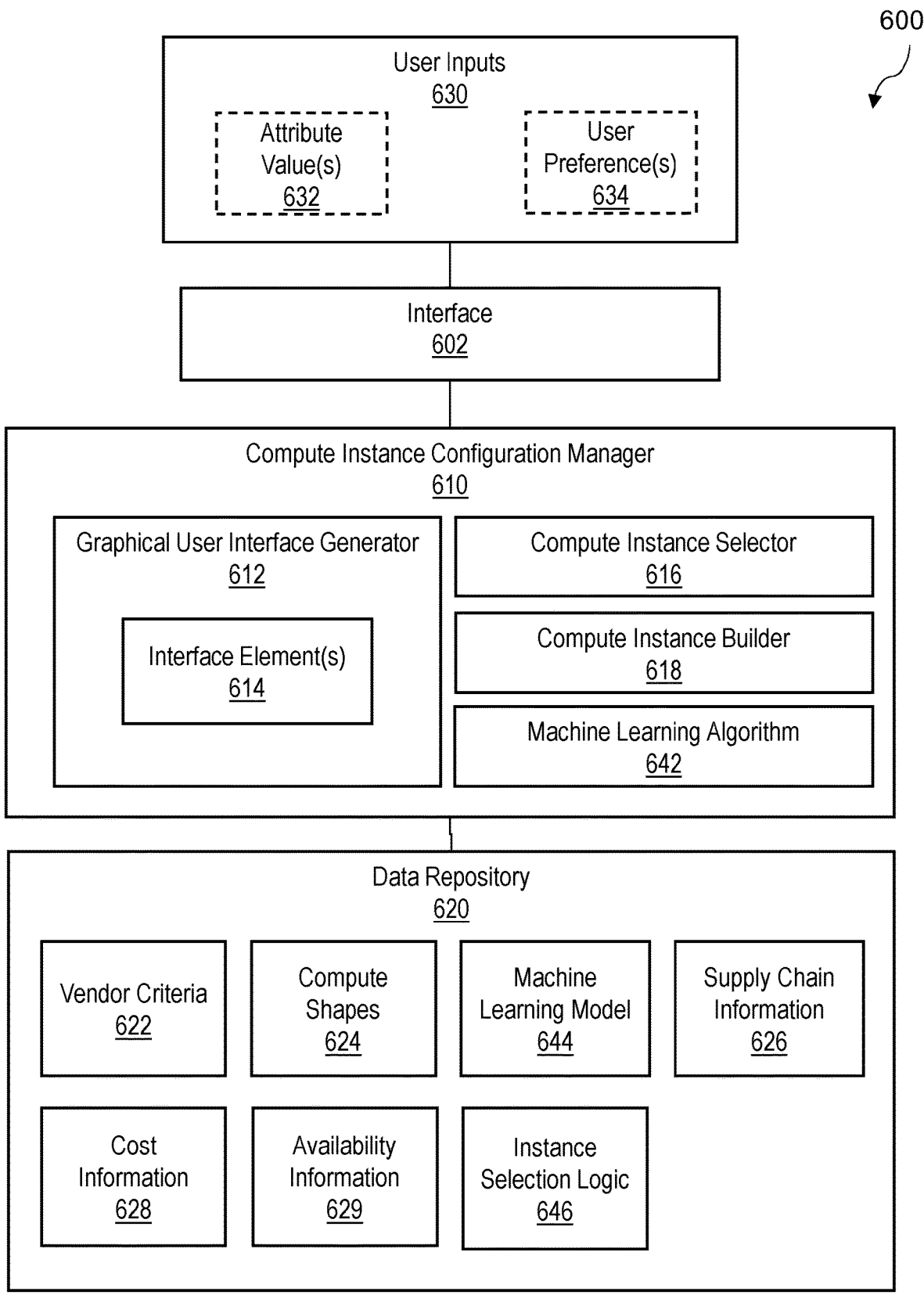
FIG. 6 illustrates a system in accordance with one or more embodiments.

FIG. 6 illustrates a system 600 in accordance with one or more embodiments. As illustrated in FIG. 6, system 600 includes an interface 602, a compute instance configuration manager 610 and a data repository 620. The compute instance configuration manager 610 may include one or more functional components, such as a graphical user interface generator 612, a compute instance selector 616, a compute instance builder 618, and a machine learning algorithm 642.

In one or more embodiments, the system 600 may include more or fewer components than the components illustrated in FIG. 6. The components illustrated in FIG. 6 may be local to or remote from each other. The components illustrated in FIG. 6 may be implemented in software and/or hardware. Each component may be distributed over multiple applications and/or machines. Multiple components may be combined into one application and/or machine. Operations described with respect to one component may instead be performed by another component.

In one or more embodiments, the compute instance configuration manager 610 refers to hardware and/or software configured to perform operations described herein for receiving user input requesting creation of a compute instance, selecting from a variety of options to create a compute instance that conforms to the request, and launching the compute instance. Examples of operations for receiving user input requesting creation of a compute instance, selecting from a variety of options to create a compute instance that conforms to the request, and launching the compute instance are described below with reference to FIGS. 8A-B, and 9.

In one or more embodiments, the graphical user interface (GUI) generator 612 refers to hardware and/or software configured to perform operations described herein for displaying one or more interface elements 614 in a GUI, receiving user inputs 630 via the interface elements 614, and providing information corresponding to the selections to the compute instance selector 616 and/or to the compute instance builder 618. For example, the GUI generator 612 may present interface elements corresponding to one or more configurable attributes. The interface elements may allow the user to indicate, for a given configurable attribute, whether the system should select a value or whether the user will provide a value as an attribute value 632. Other interface elements may allow the user to select or enter specific values for a configurable attribute. Still other interface elements may allow the user to specify preferences and/or priorities that the system should consider when selecting a value for a configurable attribute. Examples of GUIs are discussed below in reference to FIGS. 7, and 10-12.

In one or more embodiments, the compute instance selector 616 refers to hardware and/or software configured to perform operations described herein for selecting values for a compute instance when the user has indicated that the system should make the selection. The compute instance selector 616 may select the value for a configurable attribute based on user-specified criteria, such as user preferences 634. The compute instance selector 616 may select the value for a configurable attribute based on system-specified parameters, including, for example, vendor criteria 622, supply chain information 626, cost information 628, and/or availability information 629. In one or more embodiments, the compute instance selector 616 may select the value for a configurable attribute using a machine learning model 644 generated from a machine learning algorithm 642. In one or more embodiments, the compute instance selector 616 may select the value for a configurable attribute using instance selection logic 646.

In one or more embodiments, the compute instance builder 618 refers to hardware and/or software configured to perform operations described herein for receiving system-selected configurable attribute values and user-selected configurable attribute values and creating and launching a particular compute instance based on the configurable attribute values. The compute instance builder 618 may, for example, allocate, to a requesting user, a number of cores for a specific processing unit of a processor type within a particular region and/or availability domain The compute instance builder 618 may then make the allocated cores available to the requesting user along with any additional resources, such as network and storage, that the user may be need to make use of the compute instance.

In one or more embodiments, a data repository 620 is any type of storage unit and/or device (e.g., a file system, database, collection of tables, or any other storage mechanism) for storing data. Further, a data repository 620 may include multiple different storage units and/or devices. The multiple different storage units and/or devices may or may not be of the same type or located at the same physical site. Further, a data repository 620 may be implemented or executed on the same computing system as the compute instance configuration manager 610. Alternatively, or additionally, a data repository 620 may be implemented or executed on a computing system separate from the compute instance configuration manager 610. The data repository 620 may be communicatively coupled to the compute instance configuration manager 610 via a direct connection or via a network.

The vendor criteria 622 may include one or more parameters about the cloud service provider's resources, business model, or other factors that the system 600 is to consider when selecting a particular value for a configurable attribute. Supply chain information 626 may include information about installed compute shape resources and planned, but not yet delivered or installed, compute shape resources. Cost information 628 may include information about the cost of obtaining a compute shape resource, the cost of operating a compute shape resource, and/or a profit associated with operating a compute resource. Availability information 629 may include information about what compute shape resources are in use and therefore not available, and which compute shape resources are not in use and therefore available for allocation to a user.

The data repository 620 may include information about compute shapes 624. The compute shape information 624 may include information about the types of compute shapes that the cloud service provider offers to users, along with information needed to launch a compute instance from a compute shape.

Information describing the compute instance configuration manager 610 may be implemented across any of components within the system 600. However, this information is illustrated within the data repository 620 for purposes of clarity and explanation.

In one or more embodiments, the instance selection logic 646 may include logic for selecting a particular value for a configurable attribute of a compute instance. The instance selection logic 646 may include, for example, one or more decision trees for selecting a value for a configurable attribute. The instance selection logic 646 may include a weighted formula that aggregates system and/or user preferences into a ranked list of available compute shapes.

In one or more embodiments, a machine learning algorithm 642 is an algorithm that can be iterated to learn a target model f that best maps a set of input variables to an output variable. In particular, a machine learning algorithm 642 is configured to generate and/or train a machine learning model 644.

A machine learning algorithm is an algorithm that can be iterated to learn a target model f that best maps a set of input variables to an output variable, using a set of training data. The training data includes datasets and associated labels. The datasets are associated with input variables for the target model f. The associated labels are associated with the output variable of the target model f. The training data may be updated based on, for example, feedback on the accuracy of the current target model f. Updated training data is fed back into the machine learning algorithm, which in turn updates the target model f.

A machine learning algorithm 642 generates a target model f such that the target model f best fits the datasets of training data to the labels of the training data. Additionally, or alternatively, a machine learning algorithm 642 generates a target model f such that when the target model f is applied to the datasets of the training data, a maximum number of results determined by the target model f matches the labels of the training data. Different target models be generated based on different machine learning algorithms and/or different sets of training data.

A machine learning algorithm 642 may include supervised components and/or unsupervised components. Various types of algorithms may be used, such as linear regression, logistic regression, linear discriminant analysis, classification and regression trees, naïve Bayes, k-nearest neighbors, learning vector quantization, support vector machine, bagging and random forest, boosting, backpropagation, and/or clustering.

In an embodiment, the compute instance configuration manager 610 is implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant (PDA), a wireless receiver and/or transmitter, a base station, a communication management device, a router, a switch, a controller, an access point, and/or a client device.

In one or more embodiments, interface 602 refers to hardware and/or software configured to facilitate communications between a user and the compute instance configuration manager 610. Interface 602 renders user interface elements, e.g., interface elements 614, and receives input via user interface elements. Examples of interfaces include a graphical user interface (GUI), a command line interface (CLI), a haptic interface, an application programming interface (API) accessed via a console, and a voice command interface. Examples of user interface elements include checkboxes, radio buttons, dropdown lists, list boxes, buttons, toggles, text fields, date and time selectors, command lines, sliders, pages, and forms.

In an embodiment, different components of interface 602 are specified in different languages. The behavior of user interface elements is specified in a dynamic programming language, such as JavaScript. The content of user interface elements is specified in a markup language, such as hypertext markup language (HTML) or XML User Interface Language (XUL). The layout of user interface elements is specified in a style sheet language, such as Cascading Style Sheets (CSS). Alternatively, interface 602 is specified in one or more other languages, such as Java, C, or C++.

Additional embodiments and/or examples relating to computer networks are described below in Section 8, titled "Computer Networks and Cloud Networks."

4. GRAPHICAL USER INTERFACE

Figure 7:
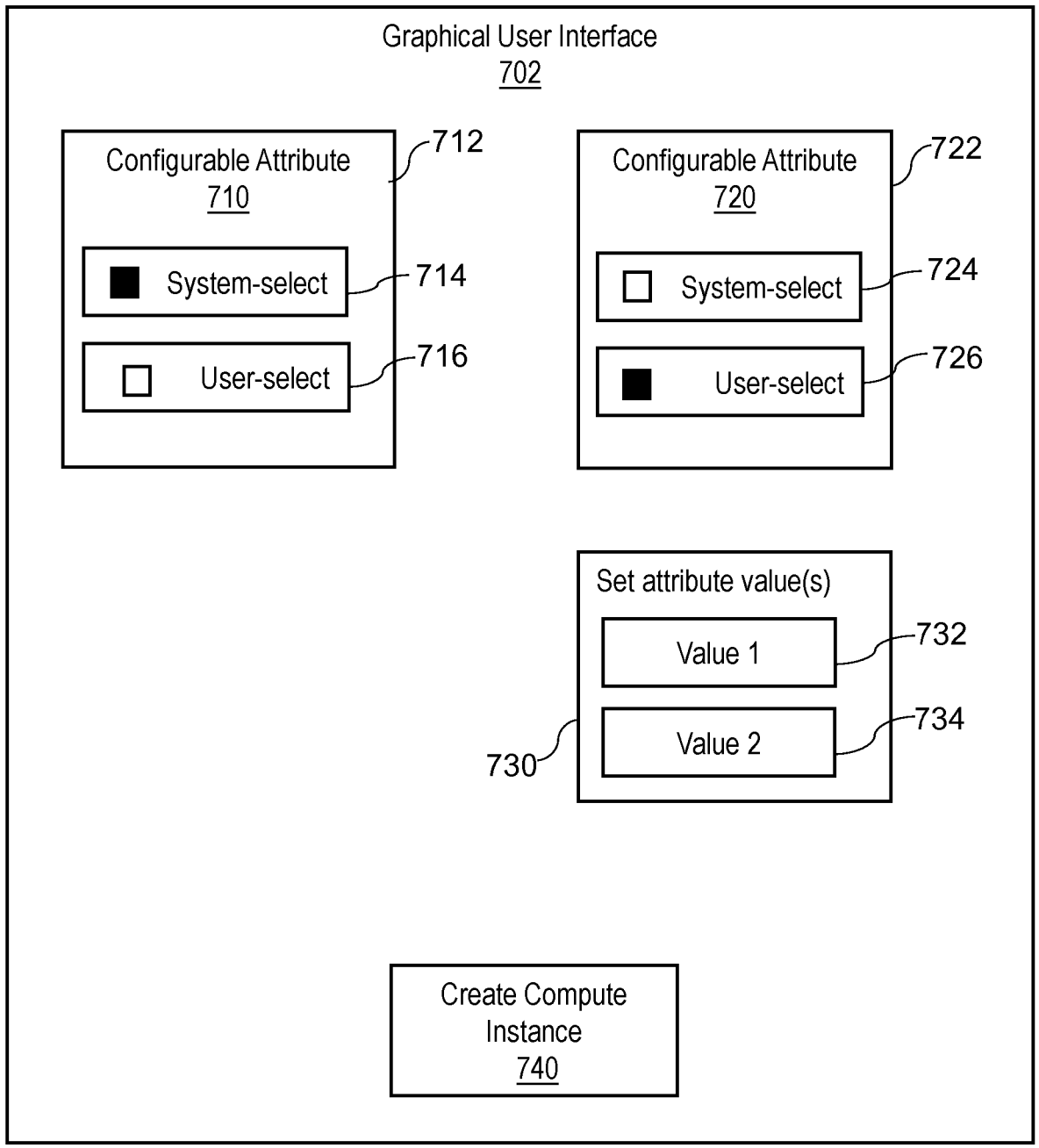
FIG. 7 illustrates an example of a graphical user interface in accordance with one or more embodiments.

FIG. 7 illustrates an example of a graphical user interface 702 as may be generated by the graphical user interface generator 612. The graphical user interface 702 may be presented via interface 602. As shown, the graphical user interface 702 is presenting four interface elements: a configurable attribute element 712, a configurable attribute element 722, an attribute value setting element 730, and a create compute instance selection element 740.

The interface element 712 represents a configurable attribute 710 and includes a selectable component 714 and a selectable component 716. Selectable component 714, when selected by a user, corresponds to a choice to have the system select a value for configurable attribute 710. Selectable component 716, when selected by a user, corresponds to a choice to allow the user to select a value for configurable attribute 710. Similarly, the interface element 722 represents a configurable attribute 720 and includes a selectable component 724 and a selectable component 726. Selectable component 724, when selected by a user, corresponds to a choice to have the system select a value for configurable attribute 720. Selectable component 726, when selected by a user, corresponds to a choice to allow the user to select a value for configurable attribute 720. In the illustrated example, the user has selected selectable elements 714 and 726.

Responsive to receiving a selection of a selectable element corresponding to a user-selected choice, e.g., element 726, the GUI 702 may present the interface element 730. The interface element 730 may include one or more input elements, such as input element 732 and input element 734. The input element(s) may allow the user to select from a set of values for the configurable attribute. The input element may, for example, provide allowable values for selection as a menu, a checklist, a slider bar, or any other interface element for selection. The input element may allow the user to enter a value, for example, in a text input field where the user can manually type or otherwise enter a value.

Once the user has selected their desired settings for their compute instance, they may select the create compute instance element 740. Responsive to that selection, the compute instance selector 616 may select values for any configurable attribute for which the user indicated a system-selected value, e.g., for configurable attribute 710. The compute instance builder 617 may then launch a compute instance based on the system-selected and user-selected values.

5. CONFIGURING A COMPUTE INSTANCE

Figure 8A:
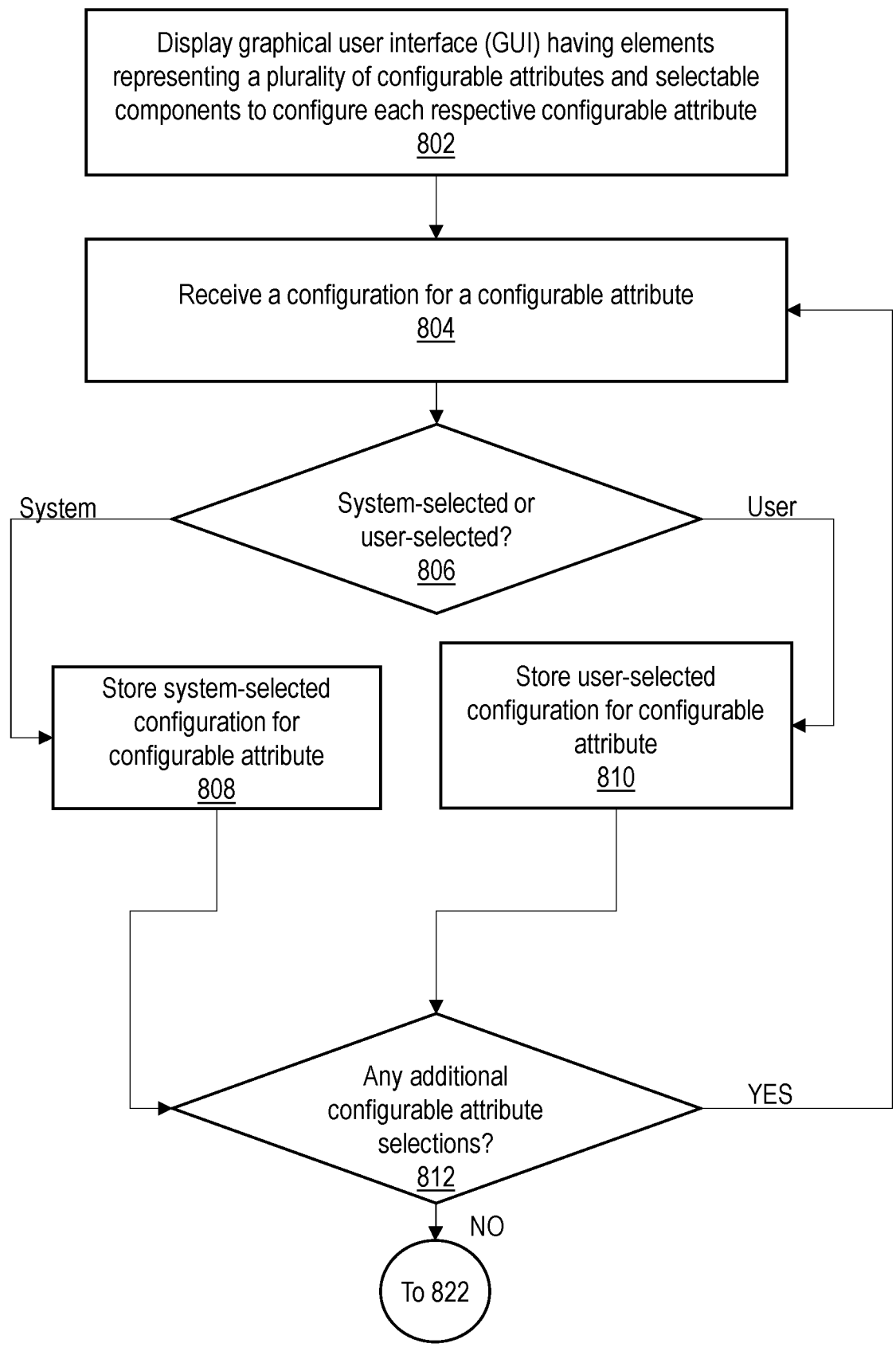
FIGS. 8A-B illustrate an example set of operations for presenting a graphical user interface for configuring and launching a compute instance in accordance with one or more embodiments.
Figure 8B:
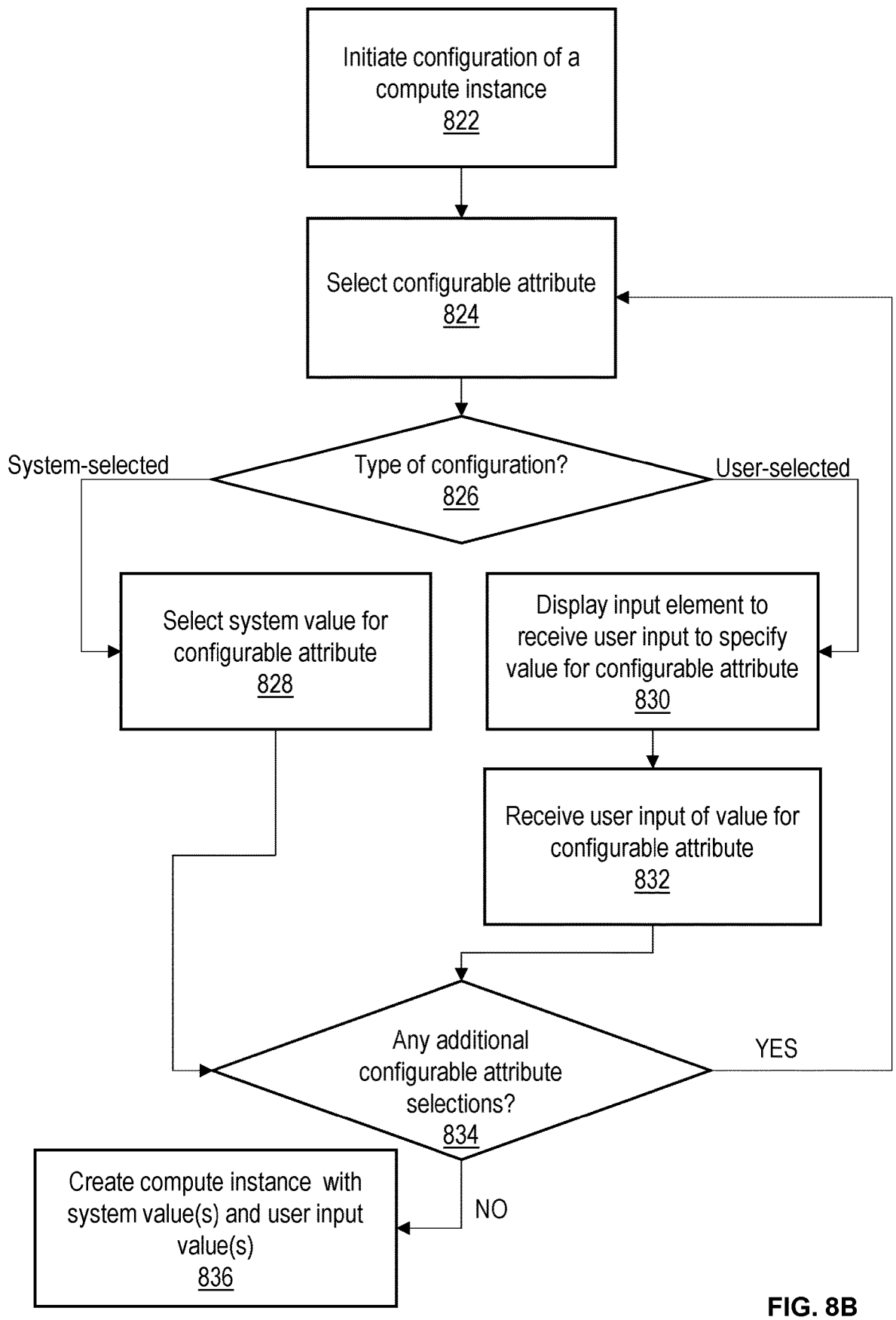

FIGS. 8A and 8B illustrate an example set of operations for presenting a graphical user interface for configuring and launching a compute instance in accordance with one or more embodiments. One or more operations illustrated in FIGS. 8A-B may be modified, rearranged, or omitted all together. Accordingly, the particular sequence of operations illustrated in FIGS. 8A-B should not be construed as limiting the scope of one or more embodiments.

The graphical user interface generator 612 may display a graphical user interface (GUI) having one or more elements each representing a different configurable attribute and selectable components to configure each respective configurable attribute (Operation 802). For example, an interface element corresponding to a configurable attribute may include the name of the configurable attribute, a first selectable component to indicate that the system should select the value and a second selectable component to indicate that the user will select the value.

The GUI generator 612 may receive a configuration for a selectable attribute (Operation 804). The user may select the first selectable component or the second selectable component for a configurable attribute. The selection of the first or second selectable component may be mutually exclusive.

The GUI generator 612 may determine whether the user has selected the first or the second selectable component for a configurable attribute (Operation 806). When the user has selected the first selectable component, the GUI generator 612 will store the system-selected indication for the configurable attribute (Operation 808). When the user has selected the second selectable component, the GUI generator 612 will store the user-selected indication for the configurable attribute (Operation 810).

The GUI generator 612 may determine whether there are any remaining configurable attribute selections to process (Operation 812). If so, then the GUI generator may return to Operation 804 to receive a configuration for another configurable attribute.

When the GUI generator 612 has received all of the configurations for the configurable attributes displayed in the GUI, the system proceeds to the operations shown in FIG. 8B.

The compute instance builder 618 may initiate the configuration of a compute instance (Operation 822). In some embodiments, the user may have selected an interface element that indicates that their request is complete, and they wish to create the compute instance.

The compute instance builder 618 may select a configurable attribute for the compute instance (Operation 824). For example, the compute instance builder 618 may select one of the processor type, availability domain, fault domain, region, or launch time configurable attributes for the compute instance.

The compute instance builder 618 may determine what type of configuration was selected for the configurable attribute (Operation 826). The compute instance builder 618 may, for example, retrieved the stored configuration for the configurable attribute.

The compute instance builder 618 may determine what type of configuration was stored for the configurable attribute (Operation 826). When the configuration is for a system-selected attribute, the compute instance selector 616 selects a value for the configurable attribute (Operation 828). The compute instance selector 616 may select, from available resources, a value for the configurable attribute according to one or more vendor-specified criteria, one or more user preferences, or both. For example, a vendor-specified criterion for a processor generation value may be to choose the latest generation first. For an availability domain configuration attribute value, a vendor-specified criterion may be to choose the availability domain that has the most unused processor cores available. Some user preferences may indicate that a user prefers one value for a configuration attribute over a different value and may include a priority ranking for multiple possible values. Other user preferences may indicate that the user wishes to specifically include a first value when available, or to exclude a second value for a configurable attribute. In one or more embodiments, the compute instance selector 616 may consider multiple vendor-specified criteria and/or multiple user preferences. The multiple vendor-specified criteria and/or user preferences may be weighted with respect to each other.

The compute instance selector 616 may use instance selection logic 645 to select the value for the configurable attribute. Alternatively, the compute instance selector 616 may use machine learning model 644 to select the value for the configurable attribute.

When the configuration is for a user-selected value, the GUI generator 612 displays an input element to receive user input specifying the value (Operation 830). The input element may include a predetermined set of possible values or a range of possible values that the user can choose from. The input element may be an input field where the user can insert any value. The GUI generator 612 or the compute instance builder 618 may check that a user-inserted value is a valid selection and may prompt the user to change their input when the value is not valid for the configurable attribute. The GUI generator 612 receives the user input of the value for the configurable attribute (Operation 832).

Alternatively, in some embodiments, the second selectable component may include an input component so that the user can simultaneously indicate that they will provide the value by providing the value in Operation 804. In some embodiments, Operations 830 and 832 may be performed instead before Operation 810.

The compute instance builder 618 determines whether there are any additional configurable attribute selections to process (Operation 834). When there are additional configurable attribute selections, the compute instance builder 618 returns to Operation 824 to select the next configurable attribute.

When there are no remaining configurable attribute selections to process, the compute instance builder 618 configures the attributes of a compute instance according to the system-selected values and the user-selected values and launches the compute instance.

Figure 9:
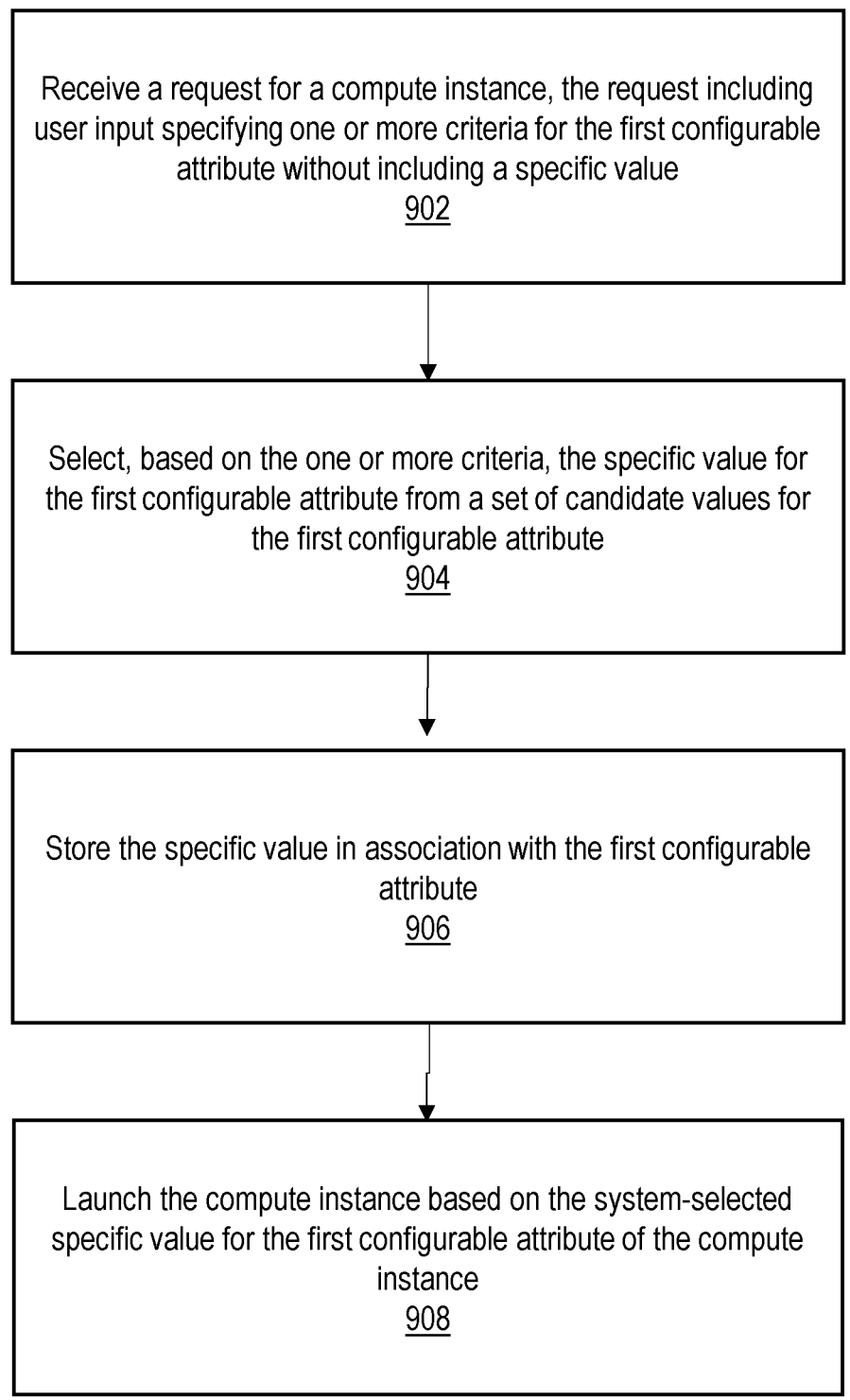
FIG. 9 illustrates an example set of operations for selecting an attribute for a configurable attribute when the user indicates that the system should select the value in accordance with one or more embodiments.

FIG. 9 illustrates an example set of operations for selecting an attribute for a configurable attribute when the user indicates that the system should select the value, in accordance with one or more embodiments. One or more operations illustrated in FIG. 9 may be modified, rearranged, or omitted all together. Accordingly, the particular sequence of operations illustrated in FIG. 9 should not be construed as limiting the scope of one or more embodiments.

The compute instance builder 618 may receive a request to create a compute instance (Operation 902). The request may include user input specifying one or more criteria for a configurable attribute of the compute instance without including a specific value for the configurable attribute. For example, the request may include a criterion for a processor of an architecture type, without specifying vendor or generation. In another example, the request may include a criterion for a North American region, without specifying a particular region.

The compute instance selector 616 may select, based on the one or more criteria, a specific value for the configurable attributes from a set of candidate values (Operation 904). The compute instance selector 616 may first determine what compute instance resources are available, for example, by evaluating compute shapes 624 and availability information 629. The compute instance selector 616 may then determine, from the available resources, a set of candidate values. For example, the compute instance selector 616 may identify what processors of the specified processor architecture are available.

The compute instance selector 616 may select a particular value from the set of candidate values according to one or more vendor-specified criteria, one or more user preferences, or both. For example, a vendor-specified criterion for a processor of a specific architecture type value may be to choose the latest generation of any available processor of that architecture type first, or to choose an available processor of the specified architecture type from an availability domain having the largest number of available processors. In one or more embodiments, the compute instance selector 616 may consider multiple vendor-specified criteria and/or multiple user preferences. The multiple vendor-specified criteria and/or user preferences may be weighted with respect to each other.

The compute instance selector 616 may use instance selection logic 645 to select the value for the configurable attribute. Alternatively, the compute instance selector 616 may use machine learning model 644 to select the value for the configurable attribute.

The compute instance selector 616 may store the system-selected value in association with the configurable attribute (Operation 906). One or more embodiments may use the stored system-selected values of configurable attributes to train or to revise the machine learning model 644. One or more embodiments, may store the system-selected value beyond the lifetime of a particular compute instance for the user and may use the system-selected value to create subsequent compute instances for the user.

The compute instance builder 618 may launch the compute instance based on the system-selected value for the configurable attribute (Operation 908). For example, the compute instance builder 618 may allocate compute shape comprised of a particular processor unit in a particular availability domain of a particular region and may provide access to the compute shape to the user.

6. EXAMPLE EMBODIMENT

A detailed example is described below for purposes of clarity. Components and/or operations described below should be understood as one specific example which may not be applicable to certain embodiments. Accordingly, components and/or operations described below should not be construed as limiting the scope of any of the claims.

Figure 10:
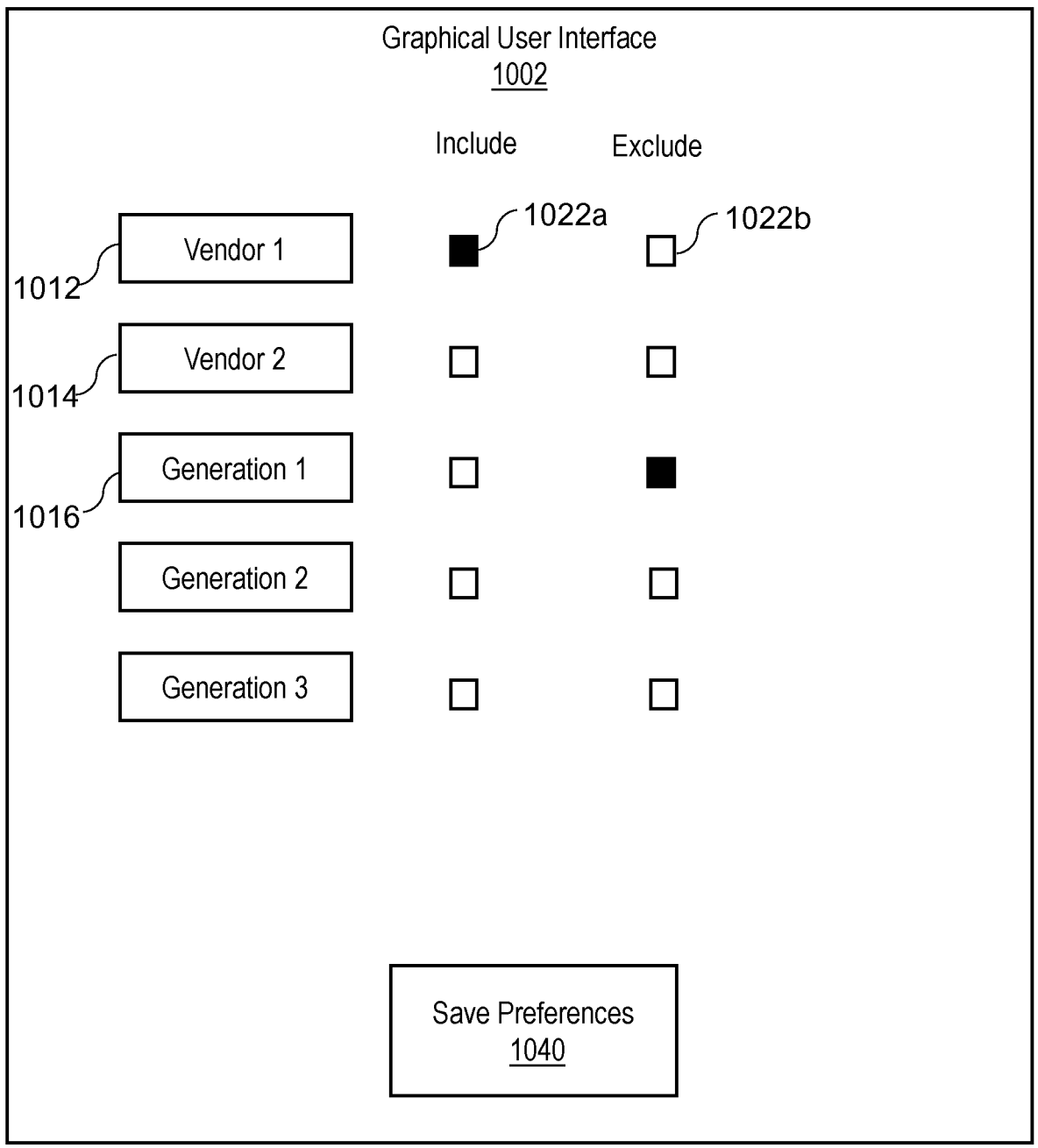
FIG. 10 illustrates an example of a graphical user interface in accordance with one or more embodiments.

FIG. 10 illustrates an example of a graphical user interface 1002 that allows a user to set preferences for how the system should select values for configurable attributes when the user specifies that the system should select the value. In particular, the graphical user interface 1002 may allow the user to indicate which configurable attribute values to include or exclude from a system-selected configurable attribute value setting operation. In the illustrated example, the graphical user interface 1002 shows a plurality of possible values for a processor type configurable attribute. A processor type configurable attribute for a processor architecture, e.g., an x86 processor architecture, may be further defined by a processor vendor, e.g., INTEL or AMD, and a generation, e.g., E2, E3, X7, X9.

The graphical user interface 1002 may list the possible values for a given configurable attribute, e.g., vendor 1 (1012) and vendor 2 (1014). Each possible value may be displayed with an include user interface element, e.g., 1022*a*, and an exclude user interface element, e.g., 1022*b*. The user may select an include user interface element to specify that the corresponding value should be included as a possible value when the system selects the value of the configurable attribute. The user may select an exclude user interface element to specify that the corresponding value should be exclude from the possible values when the system selects the value of the configurable attribute. As illustrated, the user has selected to include vendor 1 and to exclude generation 1 (1016). When neither the include user interface element nor the exclude user interface element is selected, the system may consider the corresponding value as a possible value for the configurable attribute while prioritizing any values that are specifically included by the user. For example, the system may first attempt to provide a vendor 1 processor from either generation 2 or generation 3 if available. If no vendor 1 processor is available, the system may then attempt to provide a vendor 2 processor from either generation 2 or generation 3.

Figure 11:
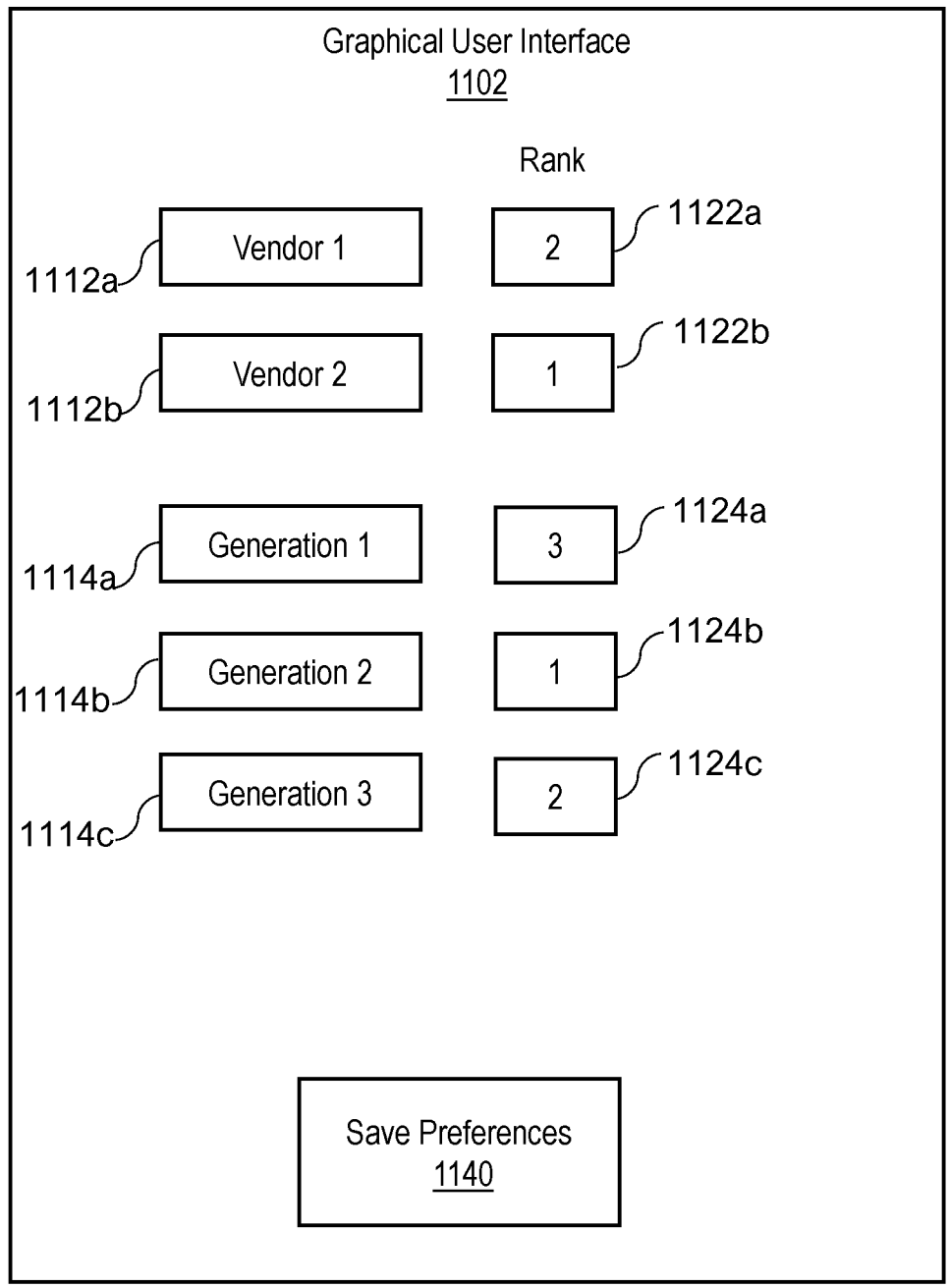
FIG. 11 illustrates an example of a graphical user interface in accordance with one or more embodiments.

FIG. 11 illustrates an example of a graphical user interface 1102 that allows a user to set preferences for how the system should select values for configurable attributes when the user specifies that the system should select the value. In particular, the graphical user interface 1102 allows the user to rank, prioritize, or otherwise order various possible values for a configurable attribute. In the illustrated example, the graphical user interface 1102 provides values for a processor architecture type configurable attribute. The processor architecture, e.g., a x86 architecture, may be available from vendor 1 (1112*a*) or vendor 2 (1112*b*). The processor architecture may be available in generation 1 (1114*a*), generation 2 (1111b), and generation 3 (1114c). As illustrated, the user has entered a priority or rank of "1" in user interface element 1122b corresponding to vendor 2, and a priority or rank of "2" in user interface element 1122a corresponding to vendor 1. The user has also entered a priority or rank of "1" in user interface element 1124b corresponding to generation 2, a priority or rank of "2" in user interface element 1124c corresponding to generation 3, and a priority or rank of "3" in user interface element 1124a corresponding to generation 1.

According to the illustrated preferences, in one or more embodiments, when the user opts to have the system select a value for the processor type within the processor architecture, the system may first try to select a generation 2 processor from vendor 2. If none are available, the system may then try to select a generation 2 processor from vendor 1 or may try to select a generation 3 processor from vendor 2. In one or more embodiments, the user or the system may assign weights to the different configurable attributes and may vary the value of the lesser weighted attribute before varying the value of a higher weighted attribute.

When the user selects the user interface element 1140 to save their preferences, the system may save the values as user preferences 634 for subsequent compute instance creation operations.

Figure 12:
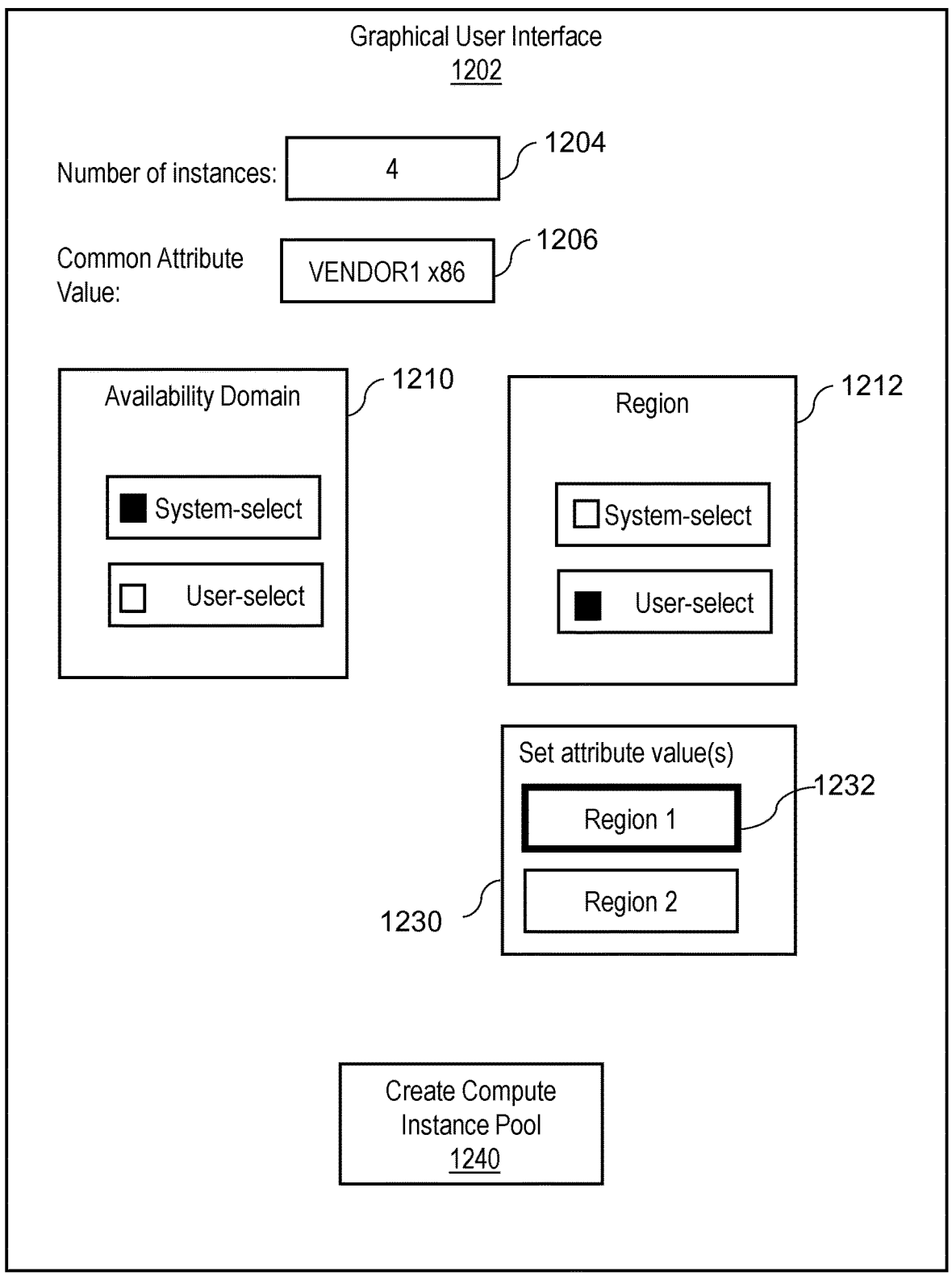
FIG. 12 illustrates an example of a graphical user interface in accordance with one or more embodiments.

FIG. 12 shows an example of a graphical user interface 1202 that allows a user to create a plurality of compute instances that will have at least one configurable attribute value in common. In the illustrated example, a user interface element 1204 allows the user to enter a number of compute instances to create, e.g., four. A user interface element 1206 allows the user to specify the configurable attribute value that all of the compute instances will have in common, e.g., an x86 processor architecture from Vendor 1. The interface elements 1204 and 1206 may be a text entry box, a drop-down menu, or any other type of interface element that allows the user to enter or select a value.

In one or more embodiments, the graphical user interface 1202 may further provide one or more additional user interface elements corresponding to other configurable attributes to allow the user to a user to select whether a value of the corresponding configurable attribute will be system-selected or user-selected. For example, user interface element 1210 corresponds to the availability domain configurable attribute and a user interface element 1212 corresponds to the region configurable attribute. In the illustrated example, the user has chosen to have the system select the availability domain.

The user has also chosen to select a value for the region. The graphical user interface 1202 accordingly presents a user interface element 1230 to allow the user to select a specific value for the region. As illustrated, the user has selected the user interface element 1232 corresponding to the value "region 1".

In the illustrated example, when the user selects the user interface element 1240 to create a pool of compute instances, the system may identify a first set of Vendor 1 x86 compute instances in region 1. The system may select the first set of Vendor 1 x86 compute instances in a first availability domain. The system may determine that the number of available compute instances in the first set of compute instances does not meet the specified number, 4, of the requested plurality of compute instances.

The system may then identify a second set of Vendor 1 x86 compute instances in region 1 in a different availability domain. If the number of available compute instances in the second set of compute instances meets the specified number, 4, of the requested plurality of compute instances, the system may select the second set of compute instances and launch the specified number of the second set of compute instances.

In some cases, the user may specify a category rather than a specific value for a configurable attribute, e.g., an x86 processor without a vendor selection. In these cases, the system may determine a set of candidate values in the category for the configurable attribute. The system may then, based on available resource, select the specific value for the configurable attribute from the set of candidate values and may launch the pool of requested compute instances having the system-selected value for the configurable attribute.

7. PRACTICAL APPLICATIONS, ADVANTAGES, AND IMPROVEMENTS

Conventionally, cloud service providers may require a user to specify all values for the configurable attributes of a compute instance. If there are no available compute shapes that meet all of the user's specified values, then the user may not be able to use the cloud service or may need to restart their request with one or more new values. Other cloud service providers may not allow the user to select any specific values for a compute instance. The user may get access to a compute instance but the compute instance may not meet the user's needs.

The one or more embodiments described herein provide a more flexible and customizable approach to providing a compute instance that allows the user to indicate what attributes they are agnostic about and which attributes they want to set specific values for. This allows the cloud service provider to expand the search from among all available compute resources that will still meet the user's specific needs.

8. COMPUTER NETWORKS AND CLOUD NETWORKS

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

9. MISCELLANEOUS; EXTENSIONS

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or services are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

The invention claimed is:

1. One or more non-transitory computer-readable media comprising instructions that, when executed by one or more hardware processors, causes performance of operations comprising:
   displaying, by a system, within a Graphical User Interface (GUI):
      a first interface element representing a first configurable attribute of a compute instance, the first interface element comprising a first selectable component and a second selectable component, wherein the first selectable component corresponds to a system-selected configuration for the first configurable attribute, and wherein the second selectable component corresponds to a user-selected configuration for the first configurable attribute;
      a second interface element representing a second configurable attribute of the compute instance, the second interface element comprising a third selectable component and a fourth selectable component, wherein the third selectable component corresponds to a system-selected configuration for the second configurable attribute, and wherein the fourth selectable component corresponds to a user-selected configuration for the second configurable attribute;
      wherein the GUI includes functionality to receive a selection of any selectable component;
   receiving a first user input selecting the first selectable component corresponding to the system-selected configuration for the first configurable attribute;
   responsive to receiving the first user input: configuring the first configurable attribute, by the system, with a system-selected first value for the first configurable attribute;
   receiving a second user input selecting the fourth selectable component corresponding to the user-selected configuration for the second configurable attribute;
   responsive to receiving the second user input, displaying a third interface element configured to receive user input specifying a second value for the second configurable attribute;
   responsive to receiving the user input specifying the second value for the second configurable attribute, storing the second value in association with the second configurable attribute; and
   launching the compute instance based on the system-selected first value for the first configurable attribute of the compute instance and the user-selected second value for the second configurable attribute.

2. The one or more non-transitory computer-readable media of claim 1, further comprising:
   display a third interface element representing a third configurable attribute of the compute instance, the third interface element configured to receive user input specifying a third value for the third configurable attribute, wherein the system requires a user-specified value for the third configurable attribute.

3. The one or more non-transitory computer-readable media of claim 1, wherein launching the compute instance comprises:
   executing the compute instance within a virtual execution environment.

4. The one or more non-transitory computer-readable media of claim 1, wherein displaying the GUI further comprises:
   displaying a fourth interface element corresponding to a set of a plurality of values for a configurable attribute, wherein the GUI includes functionality to receive a fourth user input indicating a user preference for at least one of the plurality of values.

5. The one or more non-transitory computer-readable media of claim 4, wherein the fourth user input comprises at least one of: a selection of a first value to include in the system-selected configuration and a selection of a second value to exclude from the system-selected configuration.

6. The one or more non-transitory computer-readable media of claim 4, wherein the fourth user input comprises a priority ordering of at least two values to select from in the system-selected configuration.

7. The one or more non-transitory computer-readable media of claim 1, further comprising:
   displaying the first interface element and the second interface element concurrently.

8. The one or more non-transitory computer-readable media of claim 1, wherein a configurable attribute comprises at least one of: a processor type, an availability domain, a launch time, a region, a fault domain.

9. The one or more non-transitory computer-readable media of claim 1, wherein the first configurable attribute corresponds to a one of a processor architecture, a processor vendor, and a processor generation.

10. A method comprising:
    displaying, by a system, within a Graphical User Interface (GUI):
       a first interface element representing a first configurable attribute of a compute instance, the first interface element comprising a first selectable component and a second selectable component, wherein the first selectable component corresponds to a system-selected configuration for the first configurable attribute, and wherein the second selectable component corresponds to a user-selected configuration for the first configurable attribute;
       a second interface element representing a second configurable attribute of the compute instance, the second interface element comprising a third selectable component and a fourth selectable component, wherein the third selectable component corresponds to a system-selected configuration for the second configurable attribute, and wherein the fourth selectable component corresponds to a user-selected configuration for the second configurable attribute;
       wherein the GUI includes functionality to receive a selection of any selectable component;

receiving a first user input selecting the first selectable component corresponding to the system-selected configuration for the first configurable attribute;

responsive to receiving the first user input: configuring the first configurable attribute, by the system, with a system-selected first value for the first configurable attribute;

receiving a second user input selecting the fourth selectable component corresponding to the user-selected configuration for the second configurable attribute;

responsive to receiving the second user input, displaying a third interface element configured to receive user input specifying a second value for the second configurable attribute;

responsive to receiving the user input specifying the second value for the second configurable attribute, storing the second value in association with the second configurable attribute; and launching the compute instance based on the system-selected first value for the first configurable attribute of the compute instance and the user-selected second value for the second configurable attribute;

wherein the method is performed by at least one device including a hardware processor.

11. The method of claim 10, further comprising:
displaying a third interface element representing a third configurable attribute of the compute instance, the third interface element configured to receive user input specifying a third value for the third configurable attribute, wherein the system requires a user-specified value for the third configurable attribute.

12. The method of claim 10, wherein launching the compute instance comprises:
executing the compute instance within a virtual execution environment.

13. The method of claim 10, wherein displaying the GUI further comprises:
displaying a fourth interface element corresponding to a set of a plurality of values for a configurable attribute, wherein the GUI includes functionality to receive a fourth user input indicating a user preference for at least one of the plurality of values.

14. The method of claim 13, wherein the fourth user input comprises at least one of: a selection of a first value to include in the system-selected configuration and a selection of a second value to exclude from the system-selected configuration.

15. The method of claim 13, wherein the fourth user input comprises a priority ordering of at least two values to select from in the system-selected configuration.

16. The method of claim 10, further comprising:
displaying the first interface element and the second interface element concurrently.

17. The method of claim 10, wherein a configurable attribute comprises at least one of: a processor type, an availability domain, a launch time, a region, a fault domain.

18. The method of claim 10, wherein the first configurable attribute corresponds to a one of a processor architecture, a processor vendor, and a processor generation.

19. A system comprising:
one or more hardware processors;
one or more non-transitory computer-readable media; and
program instructions stored on the one or more non-transitory computer-readable media which, when executed by the one or more hardware processors, cause the system to perform:

displaying, within a Graphical User Interface (GUI): a first interface element representing a first configurable attribute of a compute instance, the first interface element comprising a first selectable component and a second selectable component, wherein the first selectable component corresponds to a system-selected configuration for the first configurable attribute, and wherein the second selectable component corresponds to a user-selected configuration for the first configurable attribute; a second interface element representing a second configurable attribute of the compute instance, the second interface element comprising a third selectable component and a fourth selectable component, wherein the third selectable component corresponds to a system-selected configuration for the second configurable attribute, and wherein the fourth selectable component corresponds to a user-selected configuration for the second configurable attribute; wherein the GUI includes functionality to receive a selection of any selectable component;

receiving a first user input selecting the first selectable component corresponding to the system-selected configuration for the first configurable attribute;

responsive to receiving the first user input: configuring the first configurable attribute, by the system, with a system-selected first value for the first configurable attribute;

receiving a second user input selecting the fourth selectable component corresponding to the user-selected configuration for the second configurable attribute;

responsive to receiving the second user input, displaying a third interface element configured to receive user input specifying a second value for the second configurable attribute;

responsive to receiving the user input specifying the second value for the second configurable attribute, storing the second value in association with the second configurable attribute; and launching the compute instance based on the system-selected first value for the first configurable attribute of the compute instance and the user-selected second value for the second configurable attribute.

20. The system of claim 19, further comprising:
displaying a third interface element representing a third configurable attribute of the compute instance, the third interface element configured to receive user input specifying a third value for the third configurable attribute, wherein the system requires a user-specified value for the third configurable attribute.

* * * * *